(12) United States Patent
Gorti et al.

(10) Patent No.: US 8,572,110 B2
(45) Date of Patent: Oct. 29, 2013

(54) TEXTUAL SEARCH FOR NUMERICAL PROPERTIES

(75) Inventors: Suryanarayana M. Gorti, Redmond, WA (US); Ashish Consul, Redmond, WA (US); Graham Smith, Bellevue, WA (US); Pingjun Hu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 942 days.

(21) Appl. No.: 12/327,976

(22) Filed: Dec. 4, 2008

(65) Prior Publication Data
US 2010/0145970 A1    Jun. 10, 2010

(51) Int. Cl.
*G06F 7/00* (2006.01)
*G06F 17/30* (2006.01)

(52) U.S. Cl.
USPC .................... 707/763; 707/760; 707/765

(58) Field of Classification Search
None
See application file for complete search history.

(56) References Cited

U.S. PATENT DOCUMENTS

| | | | | |
|---|---|---|---|---|
| 6,167,393 A | * | 12/2000 | Davis et al. ............... | 1/1 |
| 6,430,552 B1 | * | 8/2002 | Corston-Oliver ........... | 1/1 |
| 6,708,177 B2 | | 3/2004 | Schwarcz | |
| 6,738,769 B2 | | 5/2004 | Sharp | |
| 7,289,986 B2 | | 10/2007 | Thede | |
| 2005/0071364 A1 | * | 3/2005 | Xie et al. ................. | 707/102 |
| 2005/0198027 A1 | | 9/2005 | Hamaguchi | |
| 2005/0210001 A1 | | 9/2005 | Lee | |
| 2006/0277157 A1 | * | 12/2006 | Seidl et al. ............... | 707/2 |
| 2007/0168336 A1 | * | 7/2007 | Ransil et al. ............. | 707/3 |
| 2008/0005194 A1 | * | 1/2008 | Smolen et al. ............ | 707/202 |
| 2008/0133487 A1 | * | 6/2008 | Gross et al. .............. | 707/3 |
| 2008/0183777 A1 | * | 7/2008 | Xi et al. .................. | 707/205 |

OTHER PUBLICATIONS

Martin O'Malley; Text to Speech Conversion Technology; IEEE; 1990;pp. 17-23.*
Database Search Operators, LassoSoft, LLC, Copyright © 2008, 6 pages.
Indexing Numeric Data with Isite, 4 pages, accessed Sep. 30, 2008 at http://isite.awcubed.com/NumericData.html.
Query Language, 15 pages, accessed Sep. 30, 2008 at http://code.google.com/apis/base/query-lang-spec.html.
Whitehead et al., GTE SuperPages: Using IR Techniques for Searching Complex Objects, 1997, pp. 553-557.

* cited by examiner

*Primary Examiner* — Shew-Fen Lin
*Assistant Examiner* — Jermaine Mincey
(74) *Attorney, Agent, or Firm* — Merchant & Gould

(57) ABSTRACT

A textual search index is used to identify data objects that have numerical properties that satisfy search queries. As described herein, a search index contains search index entries, each of which specifies a reference string and a set of data object identifiers. When an original search query is received, the search query is transformed into a transformed search query such that numerical comparison query elements in the original search query are transformed into equivalent textual comparison query elements. The search index is then used to identify ones of the data objects that satisfy the transformed search query. A list of the identified data objects may then be provided in response to the original search query.

19 Claims, 13 Drawing Sheets

US 8,572,110 B2

TEXTUAL SEARCH FOR NUMERICAL PROPERTIES

BACKGROUND

People throughout the world exchange enormous numbers of email messages. Due to the sheer volume of email messages sent and received by a typical person, it quickly becomes difficult for the person to identify email messages of interest. To help people identify email messages of interest, search functionality has been built into email client applications. The search functionality finds email messages that contain text that conforms to queries entered by users of the email client applications. For example, the search functionality may find all email messages that contain the words "annual budget."

To find email messages that contain text that conforms to queries, some email client applications generate search indexes and use the search indexes to identify email messages that contain the text. Search indexes can be implemented in many ways, including suffix trees, ordered trees, inverted indexes, citation indexes, ngram indexes, term document matrixes, and so on.

SUMMARY

This disclosure is directed to the use of a textual search index to identify data objects that have numerical properties that satisfy search queries. As described herein, a search index contains search index entries, each of which specifies a reference string and a set of data object identifiers. When an original search query is received, the search query is transformed into a transformed search query such that numerical comparison query elements in the original search query are transformed into equivalent textual comparison query elements. The search index is then used to identify ones of the data objects that satisfy the transformed search query. A list of the identified data objects may then be provided in response to the original search query.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

DETAILED DESCRIPTION

As briefly described above, the present disclosure is directed to the use of a search index to identify data objects that have numerical properties that satisfy search queries. This disclosure discusses the attached figures. It will be appreciated that the figures are provided for purposes of explanation only and do not represent a sole way of practicing the technologies of this disclosure. For instance, the figures illustrate the principles of this disclosure in the context of message objects. However, the principles of this disclosure are not necessarily limited to the context of message objects. Rather, the principles of this disclosure may be used in the context of other types of data objects, including file system files.

Figure 1:
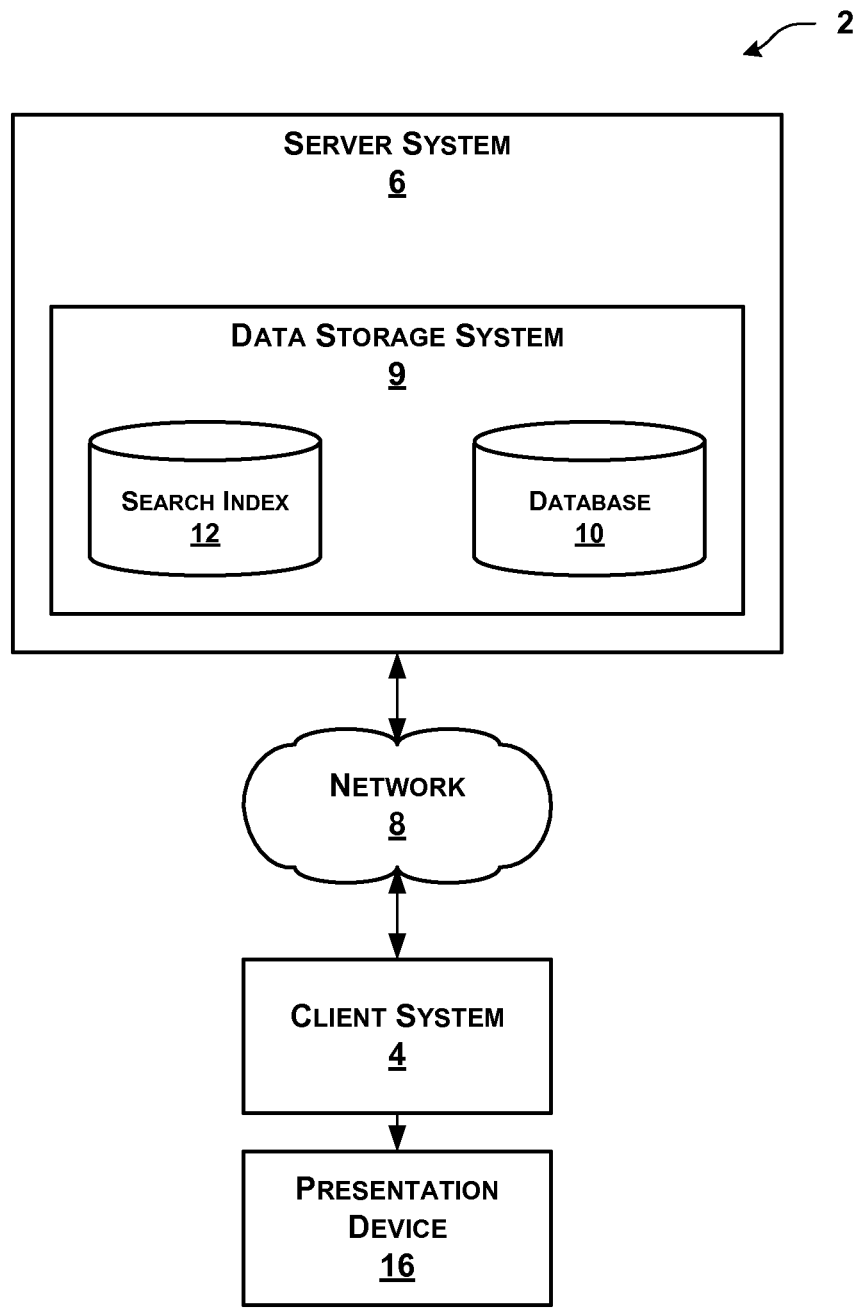
FIG. 1 is a block diagram that illustrates an example system that implements the technologies of this disclosure.

FIG. 1 is a block diagram that illustrates an example system 2 that implements the technologies of this disclosure. As illustrated in the example of FIG. 1, system 2 comprises a client system 4. As used in this disclosure, a "client system" is a set of one or more physical electronic computing devices configured to utilize a network service. For example, client system 4 may be a set of one or more personal computers, laptop computers, mobile telephones, television set-top boxes, mainframe computers, standalone server devices, blade server devices, devices integrated into vehicles, hand-held computing devices, personal digital assistants, media player devices, and other types of physical computing devices configured to utilize a network service.

Furthermore, system 2 comprises a server system 6 that provides messaging services. As used throughout this disclosure, a "server system" is a set of one or more physical electronic computing devices that provide a network service. For example, server system 6 may be a set of one or more standalone server devices, blade server devices, mainframe computers, network data centers, intermediate network devices, personal computers, and/or other types of physical computing devices configured to provide a network service.

As illustrated in the example of FIG. 1, system 2 includes a network 8. Network 8 is an electronic communications network that facilitates electronic communication between client system 4 and server system 6. For example, network 8 may be a wide-area network, such as the Internet, a local-area network, a metropolitan-area network, or another type of electronic communication network. Network 8 may include wired and/or wireless data links. A variety of communications protocols may be used in network 8 including, but not limited to, Ethernet, Transport Control Protocol (TCP), Internet Protocol (IP), Hypertext Transfer Protocol (HTTP), SOAP, remote procedure call protocols, and/or other types of communications protocols.

Server system 6 stores, at a computer-readable data storage system 9, at least one database 10. As used in this disclosure, a computer-readable data storage system is a set of one or more physical computer-readable data storage media. Example computer-readable data storage media include, but are not limited to, hard disk drives, tape drives, random-access memory units, flash memory units, floppy disks, electrically-erasable programmable read-only memory units, and other types of computer-readable data storage media. Although computer-readable data storage system 9 is shown in the example of FIG. 1 as being within server system 6, some or all of computer-readable data storage system 9 may, in some example implementations, be physically located outside of server system 6.

Database 10 includes at least one mailbox. As used in this disclosure, a "mailbox" is a logical collection of messaging objects that is associated with a user. A "messaging object" is either a folder or a message object. A "folder" in a mailbox contains a subset of the messaging objects in the mailbox. A "message object" is a collection of properties of a message that provides information to a user. Message objects may come in a variety of forms. For example, the message objects in a mailbox may be email messages. In a second example, the message objects in a mailbox may be calendar messages. Other examples of message objects include tasks, journal entries, contacts, and so on. The mailboxes stored in database 10 are peers of one another. As used in this disclosure, a first mailbox is a "peer" of a second mailbox when there does not exist any messaging object in the first mailbox that is also in the second mailbox. In other words, there is no hierarchical relationship between two mailboxes.

As mentioned above, a message object is a collection of properties. For example, the properties of an email message object may include a "to" property, a "from" property, a "subject" property, a "cc" property, a "bcc" property, a "sent time" property, a "body" property, a "reply-to" property, a "content-type" property, a "size" property, and so on. In another example, the properties of a calendar message object may include a "start date" property, a "start time" property, an "end date" property, an "end time" property, a "location" property, a "subject" property, a "notes" property, a "participants" property, an "organizer" property, a "reminder" property, and so on.

Properties can be textual properties, numerical properties, or another type of data. A textual property is a property that contains textual data. For example, a "subject" property of an email message object may include a string of characters that convey to a reader the subject of an email message. A numerical property is a property that contains numerical data. In a first example of a numerical property, a "sent time" property of an email message object may consist of four digits that represent the year that an email message was sent, two digits that represent the month that the email message was sent, and two digits that represent the day that the email message was sent. In another example of a numerical property, a "size" property of an email message object may consist of eight digits that represent the number of bytes in an email message.

Server system 6 provides functionality to search for message objects in database 10. This functionality enables server system 6 to identify message objects in database 10 denoted by search queries. As used in this disclosure, a "search query" is an expression that denotes a set of zero or more message objects. A search query comprises at least one query element. As used in this disclosure, a "query element" is a way of denoting a subset on the message objects. In this disclosure, the subset of the message objects denoted by a query element is referred to as the result set of the query element. For example, a first restriction may specify that the "body" property of the email message objects must have values that include the word "florist." In another example, a second restriction may specify that the "sent time" property of email message objects must have values that indicate times later than Oct. 31, 2008.

In addition to database 10, server system 6 stores a search index at computer-readable data storage system 9. Search index 12 is a data structure that comprises search index entries. Each of the search index entries in search index 12 maps a textual reference string to a set of at least one message object in database 10. For example, a search index entry in search index 12 may map the textual reference string "florist" to three different message objects. Server system 6 uses search index 12 to identify message objects denoted by search queries. Continuing the previous example, if a user submits to server system 6 a search query that requests all message objects that contain the word "florist", server system 6 identifies the search index entry in search index 12 that maps the word "florist" to message objects and then returns the message objects specifies by the search index entry.

Each of the search index entries in search index 12 is associated with a property. For example, a first search index entry in search index 12 may be associated with a first category and a second search index entry in search index 12 may be associated with a second category.

Each textual property of a message object is associated with a property of search index entries in search index 12. For example, email message objects may include a textual "body" property that contains the body of an email message and a textual "subject" property that contains the subject of the email message. In this example, there is a set of search index entries in search index 12 that is associated with the "body" property of email message objects and a second set of search index entries in search index 12 that is associated with the "subject" property of email message objects.

Each numerical property of a message object is associated with one or more meta-properties of search index entries in search index 12. As used in this disclosure, a "meta-property" is a property with which search index entries can be associated but is not a property of the message objects. The number of meta-properties a numerical property is associated with is proportional to a number of bits in values of the numerical property. For example, the number of meta-properties a numerical property may be associated with is proportional to a number of nibbles (i.e., four bits) in values of the numerical property. In this example, if values of a numerical property include six nibbles, the numerical property may be associated with six meta-properties, one meta-property for each of the nibbles.

In the context of this disclosure, all search queries comprise one or more query elements. As used in this disclosure, a "query element" is a way of denoting a subset of the message objects. In this disclosure, the subset of the message objects denoted by a query element is referred to as the result set of the query element. For example, the result set of one query element may be the subset of the message objects that have a subject line that includes the exact word "Panama." In this example, the query element may be written as: Exact_Match("Subject", "Panama" ).

The search query may include atomic textual comparison query elements. Each atomic textual comparison query element is associated with a textual property or a textual meta-property, a comparison string, and a string comparison relationship. An atomic textual comparison query element denotes the subset of message objects that have values of the specified textual property that are related to the comparison string according to the specified string comparison relationship. Example string comparison relationships may include prefix, suffix, substring, exact match, and other types of relationships between two text strings. For example, the result set of a prefix match textual comparison query element may be the subset of the message objects that have a subject line that includes words that start with the string "Pan." In this example, the textual comparison query element may be written as: Prefix_Match("Subject", "Pan" ). Furthermore, in this example, the result set of this example may include message objects that have subject properties that include the words "Pan," "PanAm," "Panama," "Panpipe," "Panic," and so on.

The search query may also include atomic numerical comparison query elements. Each atomic numerical comparison query element is associated with a numerical property, a numerical comparison value, and a numerical comparison relationship. An atomic numerical comparison query element denotes the subset of the message objects that have values of the specified numerical property that are related to the numerical comparison value according to the specified numerical comparison relationship. Example numerical comparison relationships are: equal to, greater than or equal to, greater than, not equal to, less than, and less or equal to. For example, the result set of a "greater than" numerical comparison query element may be the subset of the message objects that have in a year later than 2008. In this example, the numerical comparison query element may be written as: (Year>Nov. 4, 2008).

The search query may include operation query elements. An operation query element is a query element that denotes a subset of the message objects by referring to one or more other query elements, termed "operand query elements." Example operation query elements may include "and" operation query elements, "or" operation query elements, "not" operation query elements, and so on. An "and" operation query element denotes a subset of the message objects that are in both the result set of a first operand query element and a second operand query element. An "or" operation query element denotes a subset of the message objects that are in either the result set of a first operand query element or the result set of a second operand query element. A "not" operation query element denotes a subset of the message objects that is not in a result set of an operand query element.

As used in this disclosure, the general term "textual comparison query element" refers to atomic textual comparison query elements and operation query elements that include exclusively other operation query elements and atomic textual comparison query elements. Furthermore, as used in this disclosure, the general term "numerical comparison query element" refers to atomic numerical comparison query elements and operation query element that include exclusively other operation query elements and atomic numerical comparison query elements.

To use a textual search index such as search index 12 to identify the result set of an original search query that includes a numerical comparison query element, server system 6 transforms the original search query into a transformed search query. The result set of the transformed search query is the same as the result set of the original search query. However, in the transformed search query, the numerical comparison query element is replaced by an equivalent textual comparison query element. Because all the query elements in the transformed search query are textual comparison query elements, server system 6 is able to use search index 12 to efficiently identify the result set of the transformed search query.

After server system 6 transforms the original query into the transformed query, server system 6 may identify the result set of the transformed search query by using search index 12 to identify the result sets of each atomic textual comparison query element in the transformed search query and then applying operation query elements to combine and modify the result sets of the atomic textual comparison query elements. To identify a result set of an atomic textual comparison query element, server system 6 identifies each search index entry in search index 12 that: (i) is associated with a property specified by the atomic textual comparison query element; and (ii) specifies a reference string that has a string comparison relationship specified by the atomic textual comparison query element to a comparison string specified by the atomic textual comparison query element.

After identifying the result set of the transformed search query, server system 6 may, as a response to the original search query, transmit to client system 4 a list of the message objects in the result set of the transformed search query. Upon receiving the list of the message objects, client system 4 may automatically present at a presentation device 16 the list of the message objects in the result set. Presentation device 16 may be a variety of different types of devices including, but not limited to, monitors, speakers, televisions, display screens, and so on. For instance, where presentation device 16 is a monitor, client system 4 may present the list of the message objects in the result set by displaying the list of message objects in the result set. In another instance, where presentation device 16 is a speaker, client system 4 may cause the speaker to make audibly read the list of message objects in the result set.

Figure 2:
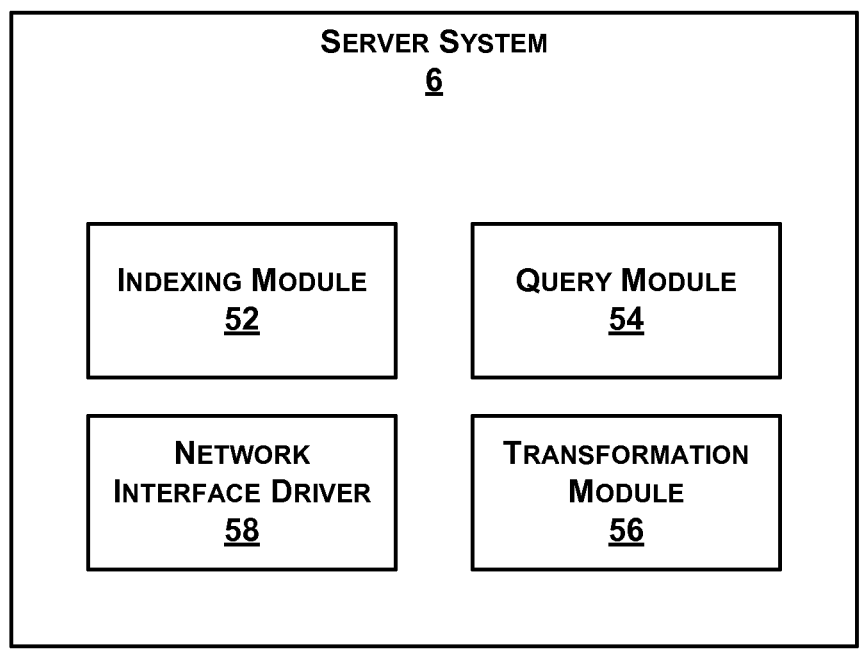
FIG. 2 is a block diagram that illustrates logical components of a server system.

FIG. 2 is a block diagram that illustrates logical components of server system 6. As illustrated in the example of FIG. 2, server system 6 comprises an indexing module 52 that builds and maintains search index 12. Furthermore, server system 6 comprises a query module 54 that receives and executes search queries. Server system 6 also comprises a transformation module 56 that automatically transforms original search queries into transformed search queries such that numerical comparison query elements in the original search queries are transformed into equivalent textual comparison query elements in the transformed search queries. This disclosure describes example operations performed by indexing module 52, query module 54, and transformation module 56 below with reference to FIGS. 3-12.

Indexing module 52, query module 54, and transformation module 56 may be implemented in a variety of ways. For example, indexing module 52, query module 54, and/or transformation module 56 may be implemented as software instructions that, when executed by a processing unit of server system 6, cause the processing unit to perform particular actions. In another example, indexing module 52, query module 54, and/or transformation module 56 may be implemented as application specific integrated circuits (ASICs) that perform particular actions. In yet another example, indexing module 52, query module 54, and/or transformation module 56 may be implemented partly as ASICs and partly as instructions that, when executed by the processing unit of server system 6, cause the processing unit to perform particular actions.

Figure 3:
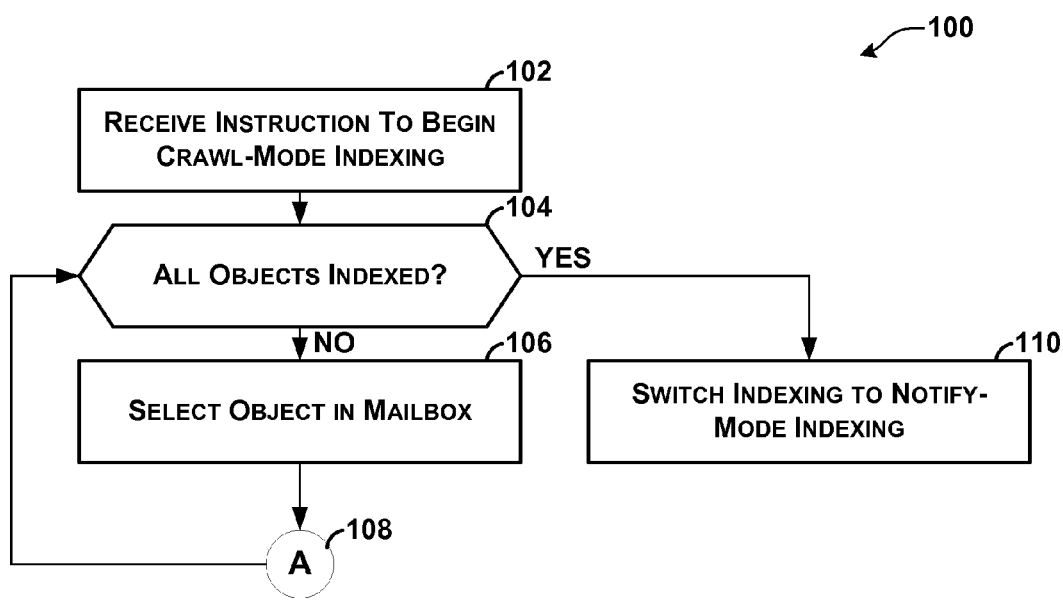
FIG. 3 is a flowchart illustrating an example operation performed by the server system to generate a search index in crawl-mode.

FIG. 3 is a flowchart illustrating an example operation 100 performed by server system 6 to generate a search index in crawl-mode. Initially, indexing module 52 receives an instruction to begin crawl-mode indexing on a mailbox stored in database 10 (102). Indexing module 52 may receive the instruction to begin crawl-mode indexing in a variety of ways. For example, indexing module 52 may receive the instruction to begin crawl-mode indexing from a software process operating at server system 6. In another example, indexing module 52 may receive the instruction to begin crawl-mode indexing from client system 4.

After receiving the instruction to begin crawl-mode indexing, indexing module 52 determines whether all message objects in the mailbox have been indexed (104). If one or more of the message objects in the mailbox have not been indexed ("NO of 104), indexing module 52 selected one of the un-indexed message objects in the mailbox (106). Indexing module 52 may select the un-indexed message objects in a random or a deterministic manner.

Figure 5:
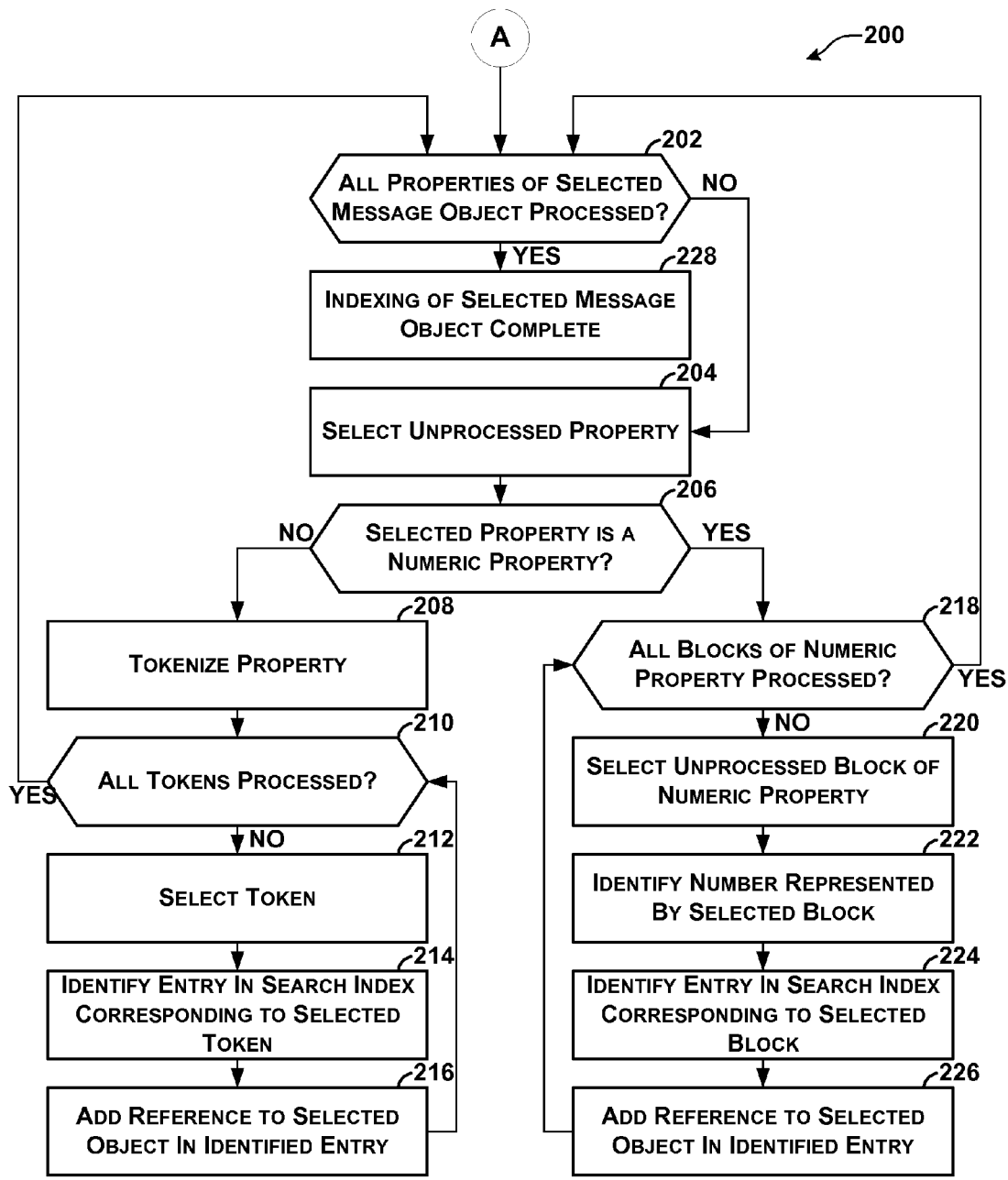
FIG. 5 is a flowchart illustrating an example operation to index a message object.

Once indexing module 52 has selected the un-indexed message object, indexing module 52 performs an operation "A" that indexes the selected message object (108). FIG. 5, discussed below, is a flowchart that presents an example operation that indexes the selected message object.

After indexing module 52 indexes the selected message object, indexing module 52 loops back and again determines whether all of the message objects in the mailbox have been indexed (104). If all of the message objects in the mailbox have been indexed ("YES" of 104), indexing module 52 switches the indexing mode of the mailbox from crawl-mode indexing to notify-mode indexing (110). When the indexing mode of a mailbox is in notify-mode indexing, indexing module 52 indexes individual message objects in response to index events that notify indexing module 52 to changes to the mailbox. In other words, when the indexing mode of a mailbox is in notify-mode indexing, the search index for the mailbox is maintained.

Figure 4:
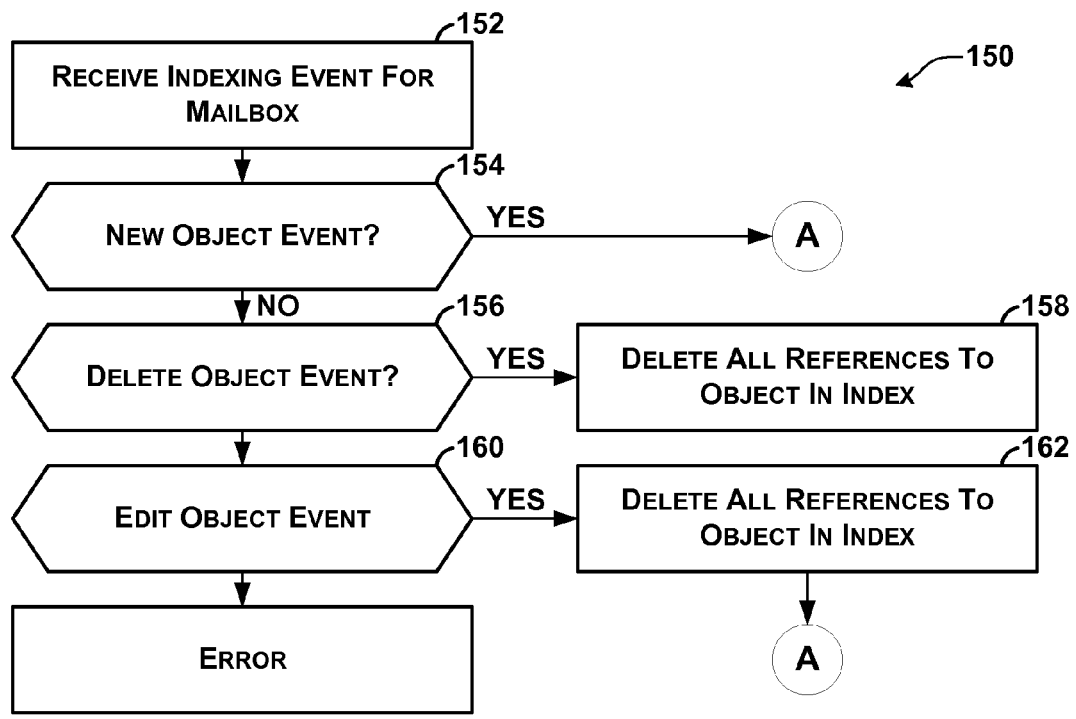
FIG. 4 is a flowchart illustrating an example operation performed by the server system to maintain the search index.

FIG. 4 is a flowchart illustrating an example operation 150 performed by server system 6 to maintain the search index.

Operation 150 starts when indexing module 52 receives an indexing event that notifies indexing module 52 that a change has occurred in a mailbox that is notify-mode indexing (152). The indexing event may notify indexing module 52 that a variety of different changes have occurring in the mailbox. For instance, the indexing event may notify indexing module 52 that a message object has been added to the mailbox, that a message object has been deleted from the mailbox, that a message object in the mailbox has changed, or that another type of change has occurred to a message object in the mailbox.

After receiving the indexing event, indexing module 52 determines whether the indexing event is a new message object event (154). A new message object event is an event that notifies indexing module 52 that a new message object has been added to the mailbox. If the indexing event is a new message object event ("YES" of 154), indexing module 52 may perform the example operation "A" illustrated in the example of FIG. 5 to index the new message object.

On the other hand, if the indexing event is not a new message object event ("NO" of 154), indexing module 52 determines whether the indexing event is a delete message object event (156). A delete message object event is an event that notifies indexing module 52 that a message object in the mailbox has been deleted from the mailbox. If the indexing event is a delete message object event ("YES" of 156), indexing module 52 deletes all references in search index 12 to the deleted message object (158).

If the indexing event is not a delete message object event ("NO" of 156), indexing module 52 determines whether the event is an edit message object event (160). An edit message object event is an event that notifies indexing module 52 that a message object in the mailbox has been edited. For example, a calendar message object may be edited when a user changes a start time property of the calendar message object. If the indexing event is an edit message object event ("YES" of 160), indexing module 52 may delete all references in search index 12 to the edited message (162). Indexing module 52 may then perform the example operation "A" illustrated in the example of FIG. 5 with respect to the edited message object.

FIG. 5 is a flowchart illustrating an example operation 200 of server system 6 to index a message object.

Initially, indexing module 52 determines whether all properties of the message object have been processed (202). If indexing module 52 determines that one or more of the properties of the message object have not been processed ("NO" of 202), indexing module 52 selected one of the unprocessed properties of the message object (204). In various implementations, indexing module 52 may select the property on a random or a deterministic basis.

After selecting the property, indexing module 52 determines whether the selected property is a numerical property (206). If indexing module 52 determines that the selected property is a textual property (i.e., not a numerical property) ("NO" of 206), indexing module 52 tokenizes the selected property (208). Tokenizing is the processed of breaking a textual string down into a set of tokens. In general, the tokens are words. After tokenizing the selected property, indexing module 52 determines whether all of the tokens have been processed (210).

If one or more of the tokens have not been processed ("NO" of 210), indexing module 52 selects one of the tokens (212). Indexing module 52 then identifies a search index entry in search index 12 that belongs to a category associated with the selected property and that corresponds to the selected token (214). For example, if the selected property of an email message object is the "body" property and if the selected token is the word "coin," indexing module 52 identifies a search index entry in search index 12 that belongs to a category associated with the "body" property and that specifies the word "coin." If search index 12 does not include a search index entry that corresponds to the selected token, indexing module 52 generates in search index 12 a new search index entry that belongs to a category associated with the selected property and that corresponds to the selected token. After identifying or creating the search index entry in search index 12, indexing module 52 adds a reference in the search index entry to the message object (216). For example, indexing module 52 may add a reference in the search index entry to the message object by adding a globally unique identifier of the message object to the search index entry. Indexing module 52 then loops back and again determine whether all of the tokens have been processed (210). If all of the tokens have been processed ("YES" of 210), the selected property has been processed. To continue processing the properties of the message object, indexing module 52 loops back and again determines whether all properties of the message object have been processed (202).

If indexing module 52 determines that the selected property is a numerical property ("YES" of 206), indexing module 52 determines whether all blocks of the selected property has been processed (218). As explained above, a block of a property is a fixed-size set of bits within the numerical property. If one or more of the blocks of the selected property have not been processed ("NO" of 218), indexing module 52 selects one of the unprocessed blocks of the selected numerical property (220). In various implementations, indexing module 52 may select the unprocessed block on a random or a deterministic basis.

After selecting the block, indexing module 52 identifies a number represented by bits in the selected block of the selected numerical property (222). Indexing module 52 then identifies a search index entry in search index 12 that is associated with a meta-property associated with the selected block and that contains a reference string comprising a base comparison string having a length proportional to the number represented by the bits in the selected block of the selected numerical property (224). For example, if the selected numerical property is the "send time" property of an email message object and if the bits in the selected block are 0110 (i.e., 0x6), indexing module 52 identifies a search index entry in search index 12 that (i) is associated with a meta-property associated with the selected block and (ii) includes a reference string that has a textual prefix followed by a base reference string of six text characters. In this example, if the textual prefix for the mailbox is "e2f5aa1", indexing module 52 identifies a search index entry in search index 12 that is associated with a meta-property associated with the selected block and that specifies the reference string "e2f5aa1zzzzzz". Note that in this example, the number of text characters 'z' in the base reference string that follows the textual prefix is equal to the number represented by bits in the selected block of the selected numerical property. If indexing module 52 is unable to identify a search index entry in search index 12 that is associated with a meta-property associated with the selected block that includes a reference string comprising a base reference string having a length proportional to the number represented by the bits in the selected block of the selected numerical property, indexing module 52 creates in search index 12 a search index entry that is associated with a meta-property associated with the selected block and that includes a reference string that includes the textual prefix followed by a base reference string that has a length proportional to the number represented by the bits in the selected block of the selected numerical property.

After identifying or generating the search index entry in search index 12, indexing module 52 adds an identifier of the message object to the search index entry (226). Indexing module 52 may add the identifier of the message object by adding a globally unique identifier associated with the message object to the search index entry. Indexing module 52 then loops back and again determines whether all blocks of the selected numerical property have been processed (218). If indexing module 52 determines that all blocks of the selected numerical property have been processed ("YES" of 218), indexing module 52 loops back and again determines whether all properties of the message object have been processed (202). If all properties of the message object have been processed ("YES" of 202), the indexing operation for the message object is complete (228).

Figure 6:
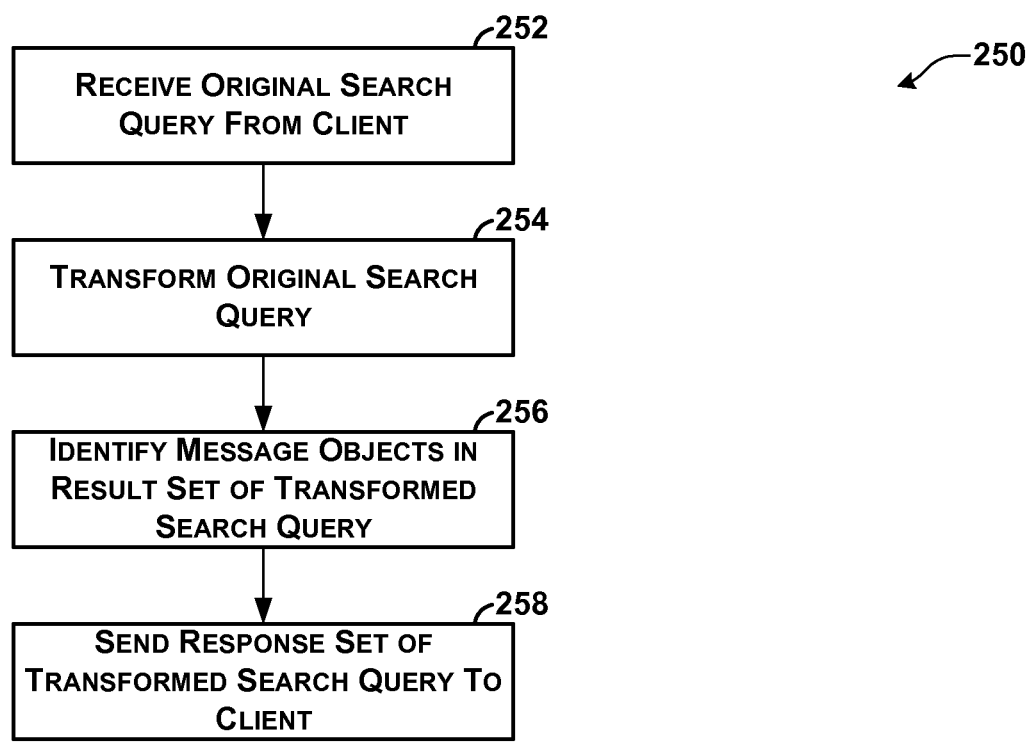
FIG. 6 is a flowchart illustrating an example operation of the server system to process a query.

FIG. 6 is a flowchart illustrating an example operation 250 of server system 6 to process a search query. Initially query module 54 receives an original search query (252). Query module 54 may receive the original search query from a variety of sources. For example, query module 54 may receive the original search query from a process at server system 6. In another example, query module 54 may receive the original search query from client system 4.

After query module 54 receives the original search query, query module 54 transforms the original search query into a transformed search query such that numerical comparison query elements in the original search query are transformed into equivalent textual comparison query elements (254). A numerical comparison textual comparison query element is equivalent to a textual comparison query element when the numerical comparison query element and the textual comparison query element have the same result set. This disclosure describes example operations to transforms the original search query with reference to the examples of FIGS. 7-13.

Once query module 54 has transformed the original search query into the transformed search query, query module 54 uses search index 12 to identify a result set of the transformed search query (256). As mentioned to above, the transformed search query may include exact match textual comparison query elements and prefix match textual comparison query elements. When query module 54 identifies a result set of a prefix match textual comparison query element, query module 54 identifies search index entries in search index 12 that are associated with a property specified by the prefix match textual comparison query element and that specify a reference string that is a prefix of the comparison string specified by the prefix match textual comparison query element. The message object identifiers specified by the identified search index entries identify the message objects that are in the result set of the prefix match textual comparison query element. When query module 54 processes an exact match textual comparison query element, query module 54 identifies search index entries in search index 12 that are associated with property specified by the exact match textual comparison query element and that specify a reference string that is textually equal to a comparison string specified by the exact match textual comparison query element. The message object identifiers specified by the identified search index entries identify the message objects that are in the result set of the exact match textual comparison query element.

Query module 54 then returns the response set of the transformed query to a sender of the original search query as a response to the original search query (258). For example, if client system 4 is the sender of the original search query, query module 54 may send the response set of the transformed search query to client system 4.

Figure 7:
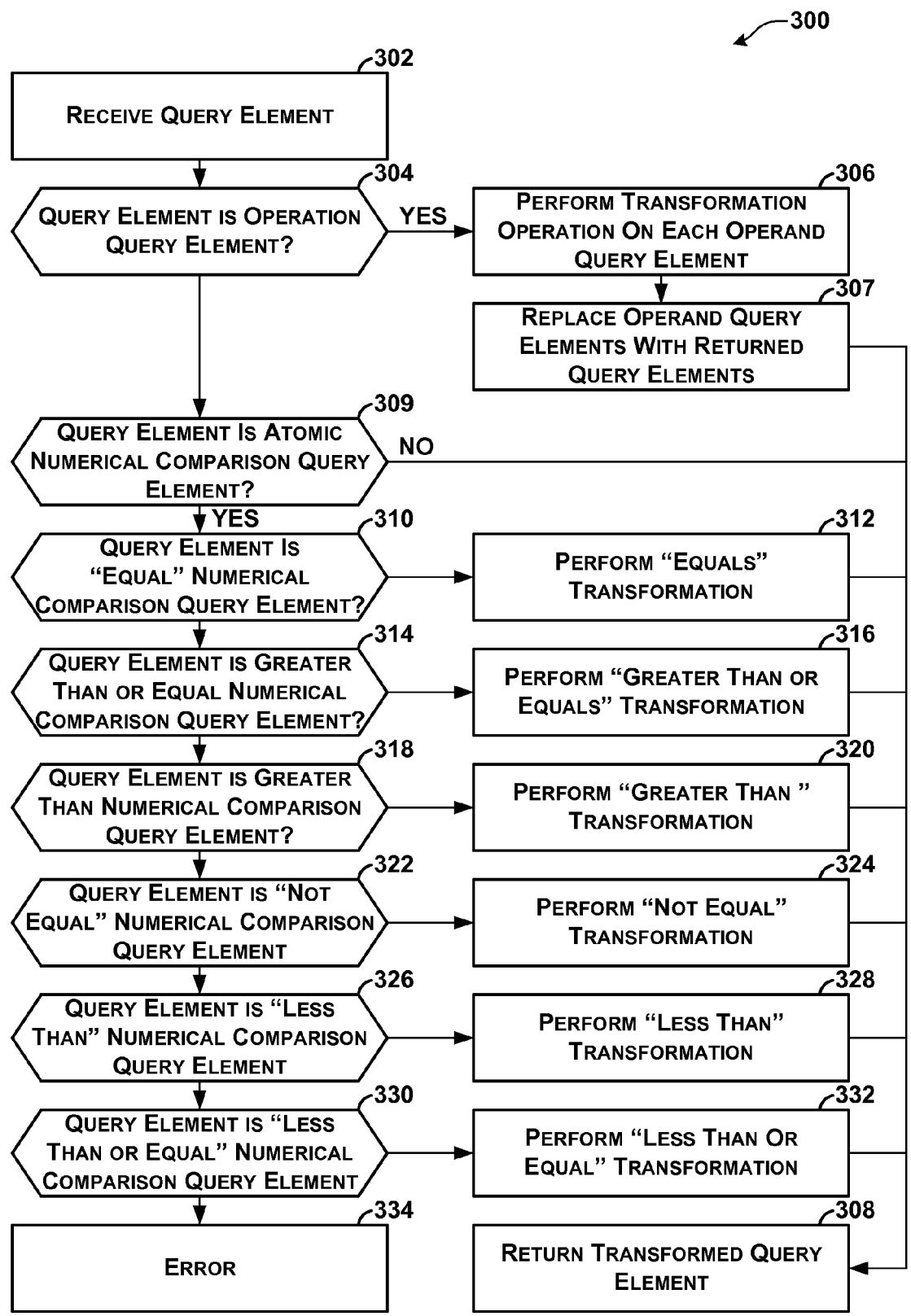
FIG. 7 is a flowchart illustrating an example operation of the server system to transform the query.

FIG. 7 is a flowchart illustrating an example operation 300 of server system 6 to transform the search query. As illustrated in the example of FIG. 7, operation 300 starts when transformation module 56 receives a query element (302). In this example, the original search query is structured as a single query element that may or may not be an operation query element. For example, the original search query may denote all message objects in the mailbox that were sent after Jun. 1, 2008 that include the word "Peru" in their subject lines. In this example, the original search query may be an "and" operation query element. The first operand query element of the "and" operation query element is an atomic numerical comparison query element that has a result set of all message objects having sent dates greater than Jun. 1, 2008. The second operand query element of the "and" operation query element is a textual comparison query element that has a result set of all message objects having subjects that include the word "Peru."

After receiving the query element, transformation module 56 determines whether the received query element is an operation query element (304). If the received query elements is an operation query element ("YES" of 304), transformation module 56 performs operation 300 on each operand query element of the received query element (306). After performing operation 300 on each operand query element, transformation module 56 replaces each of the operand query elements in the received query elements with the query elements returned by performing operation 300 on the operand query elements. In this way, each numerical comparison query element in the operation query element is transformed into an equivalent textual comparison query element. Once transformation module 56 has replaced the operand query elements, transformation module 56 returns the now-transformed query element (308).

If transformation module 56 determines that the received query element is not an operation query element ("NO" of 304), transformation module 56 determines whether the query element is an atomic numerical comparison query element (309). If the query element is not an atomic numerical comparison query element (i.e., the received query element is an atomic textual comparison query element) ("NO" of 309), transformation module 56 returns the received query element (308).

Figure 8:
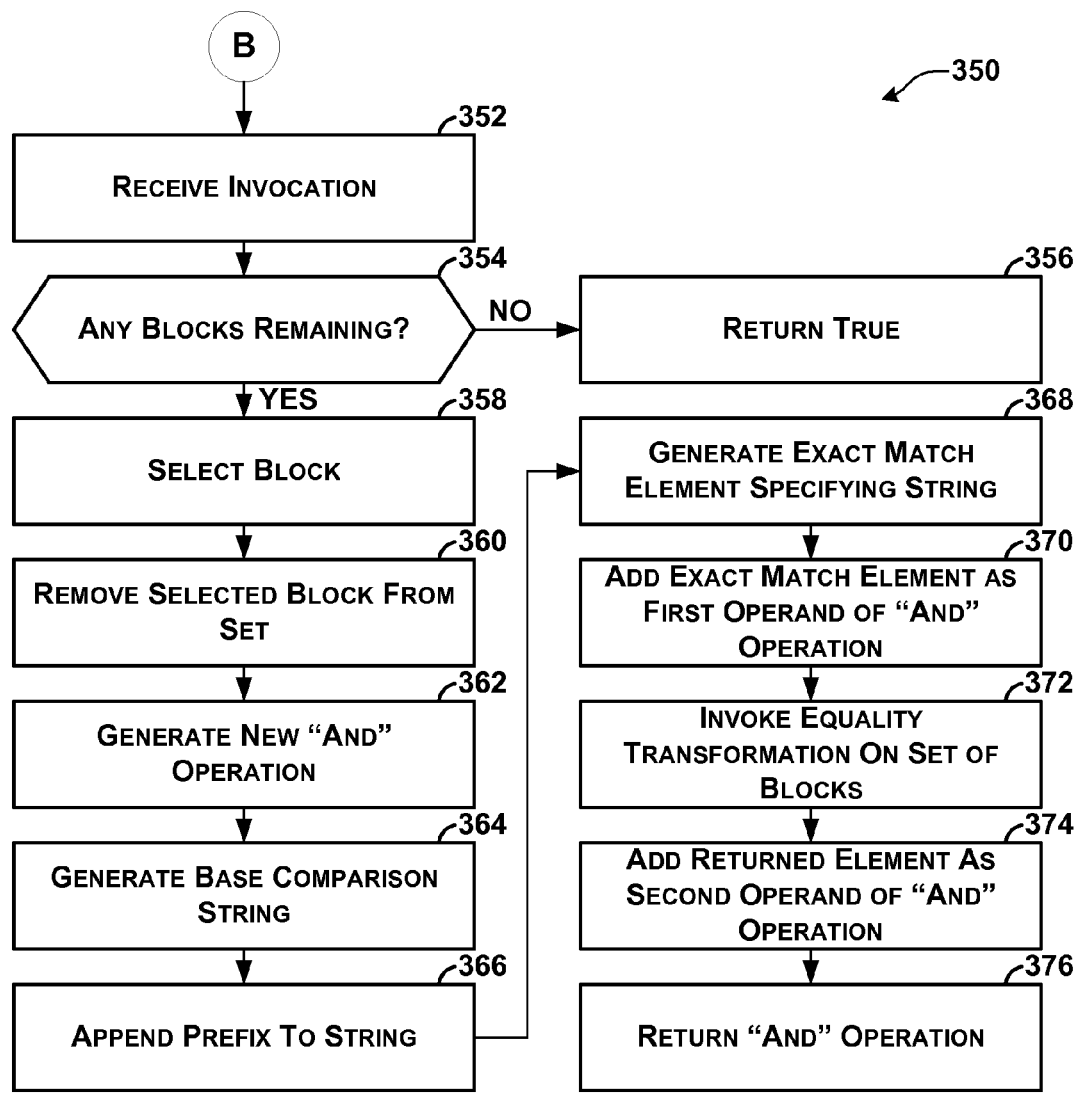
FIG. 8 is a flowchart illustrating an example operation of the server system to transform an "equal" numerical comparison query element.

On the other hand, if the received query element is a numerical comparison query element ("YES" of 309), transformation module 56 determines whether the query element is an "equals" numerical comparison query element (310). A message object is in a result set of an "equals" numerical comparison query element when the message object has a value of a property specified by the "equals" numerical comparison query element that is equal to a comparison value specified by the "equals" numerical comparison query element. If transformation module 56 determines that the query element is an "equals" numerical comparison query element ("YES" of 310), transformation module 56 performs an operation that transforms the "equals" numerical comparison query element (312). FIG. 8, described below, illustrates an example operation to transform the "equals" numerical comparison query element. After transformation module 56 transforms the query element, transformation module 56 returns the textual comparison query element generated by performing the operation that transforms the "equals" numerical comparison query element (308).

Figure 9:
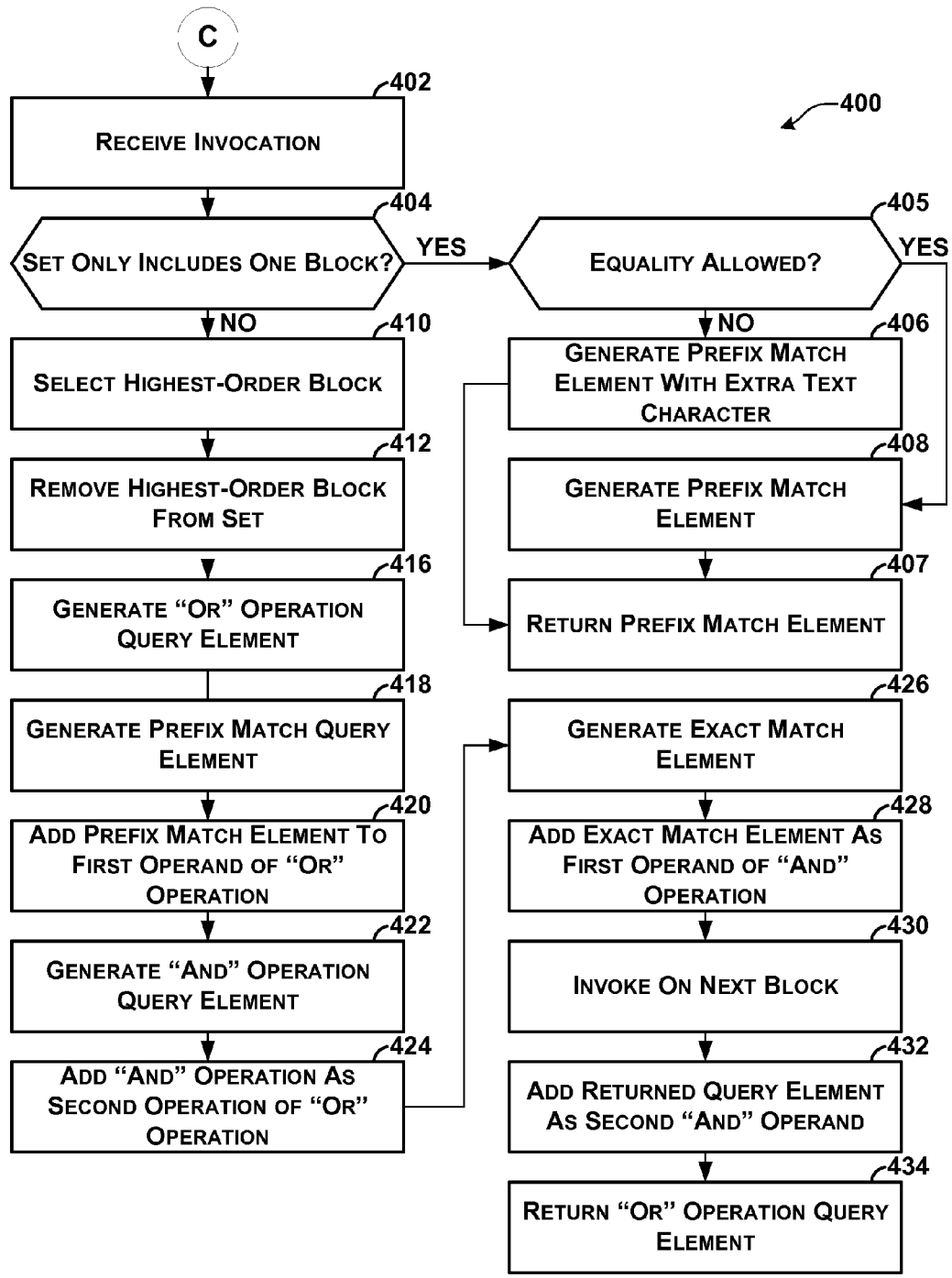
FIG. 9 is a flowchart illustrating an example operation of the server system to transform a "greater than or equal" numerical comparison query element.

If the received query element is not an "equals" numerical comparison query element ("NO" of 310), transformation module 56 determines whether the received query element is a "greater than or equal" numerical comparison query element (314). A message object is in a result set of an "greater than or equal" numerical comparison query element when the message object has a value of a property specified by the "greater than or equal" numerical comparison query element that is greater than or equal a comparison value specified by the "greater than or equal" numerical comparison query element. If transformation module 56 determines that the received query element is a "greater than or equal" numerical comparison query element ("YES" of 314), transformation module 56 performs an operation that transforms the "greater than or equal" numerical comparison query element (316). FIG. 9, described below, illustrates an example operation to transform the "greater than or equal" numerical comparison query element. After transformation module 56 transforms the "greater than or equal" numerical comparison query element, transformation module 56 returns the textual comparison query element generated by performing the operation that transforms the "greater than or equal" numerical comparison query element (308).

If the received query element is not a "greater than or equal" numerical comparison query element ("NO" of 314), transformation module 56 determines whether the received query element is a "greater than" numerical comparison query element (318). A message object is in a result set of a "greater than" numerical comparison query element when the message object has a value of a property specified by the "greater than" numerical comparison query element that is greater than a comparison value specified by the "greater than" numerical comparison query element. If transformation module 56 determines that the received query element is a "greater than" numerical comparison query element ("YES" of 318), transformation module 56 performs an operation that transforms the "greater than" numerical comparison query element (320). FIG. 9, described below, illustrates an example operation to transform the "greater than" numerical comparison query element. After transformation module 56 transforms the "greater than" numerical comparison query element, transformation module 56 returns the textual comparison query element generated by performing the operation that transforms the "greater than" numerical comparison query element (306).

Figure 10:
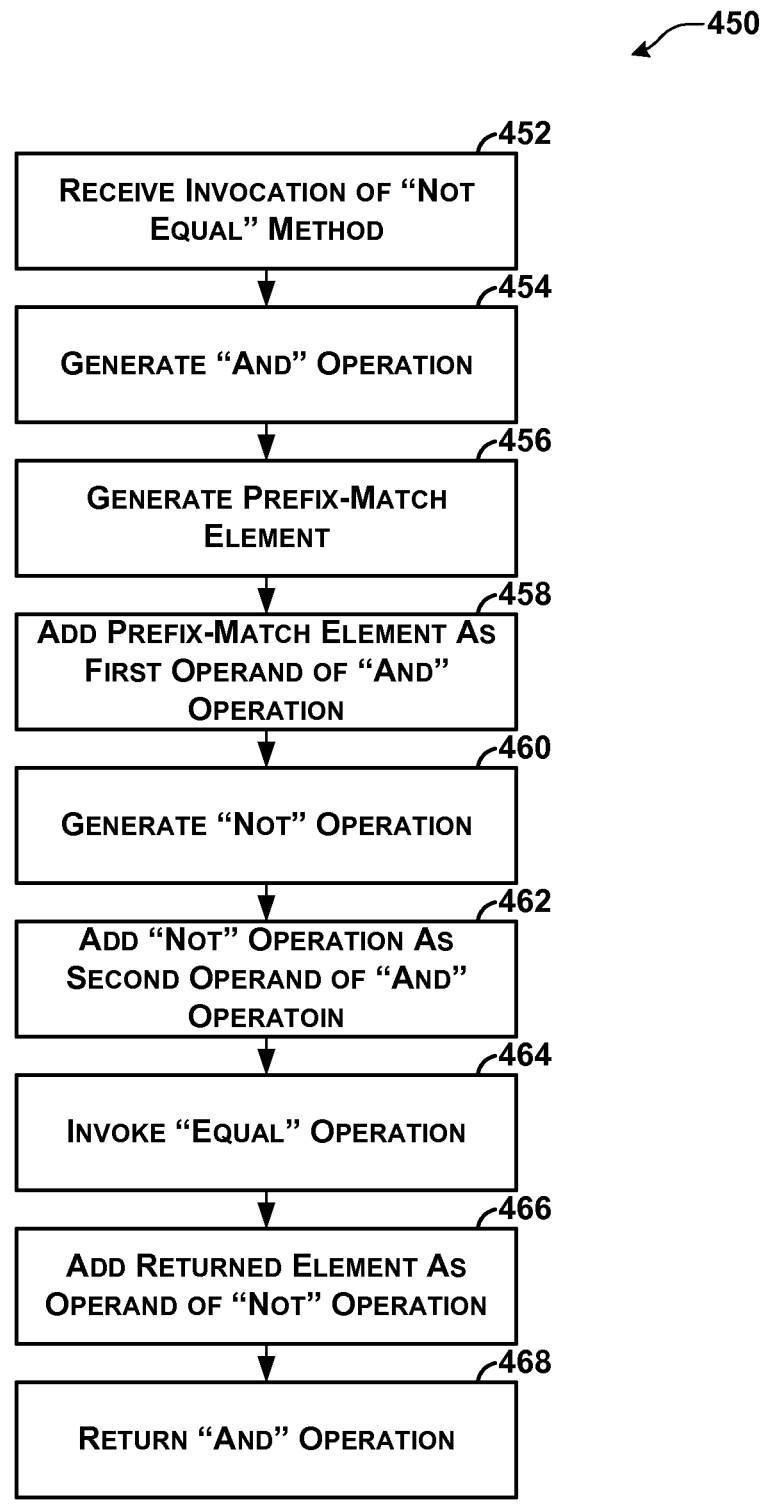
FIG. 10 is a flowchart illustrating an example operation of the server system to transform a "not equal to" numerical comparison query element.

If the received query element is not a "greater than" numerical comparison query element ("NO" of 318), transformation module 56 determines whether the received query element is a "not equal" numerical comparison query element (322). A message object is in a result set of a "not equal" numerical comparison query element when the message object has a value of a property specified by the "not equal" numerical comparison query element that is not equal to a comparison value specified by the "not equal" numerical comparison query element. If transformation module 56 determines that the received query element is a "not equal" numerical comparison query element ("YES" of 322), transformation module 56 performs an operation that transforms the "not equal" numerical comparison query element (324). FIG. 10, described below, illustrates an example operation to transform the "not equal" numerical comparison query element. After transformation module 56 transforms the "not equal" numerical comparison query element, transformation module 56 returns the textual comparison query element generated by performing the operation that transforms the "not equal" numerical comparison query element (306).

Figure 11:
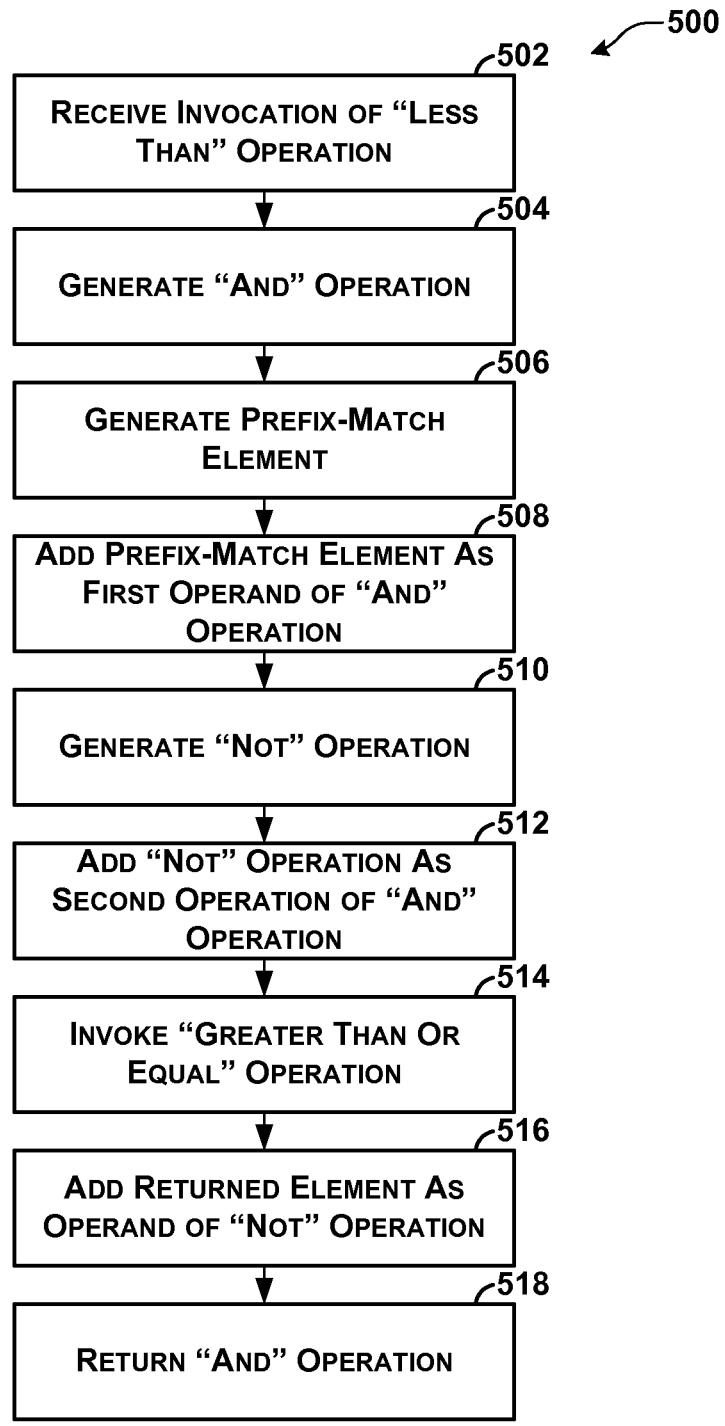
FIG. 11 is a flowchart illustrating an example operation of the server system to transform a "less than" numerical comparison query element.

If the received query element is not a "not equal" numerical comparison query element ("NO" of 322), transformation module 56 determines whether the received query element is a "less than" numerical comparison query element (326). A message object is in a result set of a "less than" numerical comparison query element when the message object has a value of a property specified by the "less than" numerical comparison query element that is less than a comparison value specified by the "less than" numerical comparison query element. If transformation module 56 determines that the received query element is a "less than" numerical comparison query element ("YES" of 326), transformation module 56 performs an operation that transforms the "less than" numerical comparison query element (328). FIG. 11, described below, illustrates an example operation to transform the "less than" numerical comparison query element. After transformation module 56 transforms the "less than" numerical comparison query element, transformation module 56 returns the textual comparison query element generated by performing the operation that transforms the "less than" numerical comparison query element (308).

Figure 12:
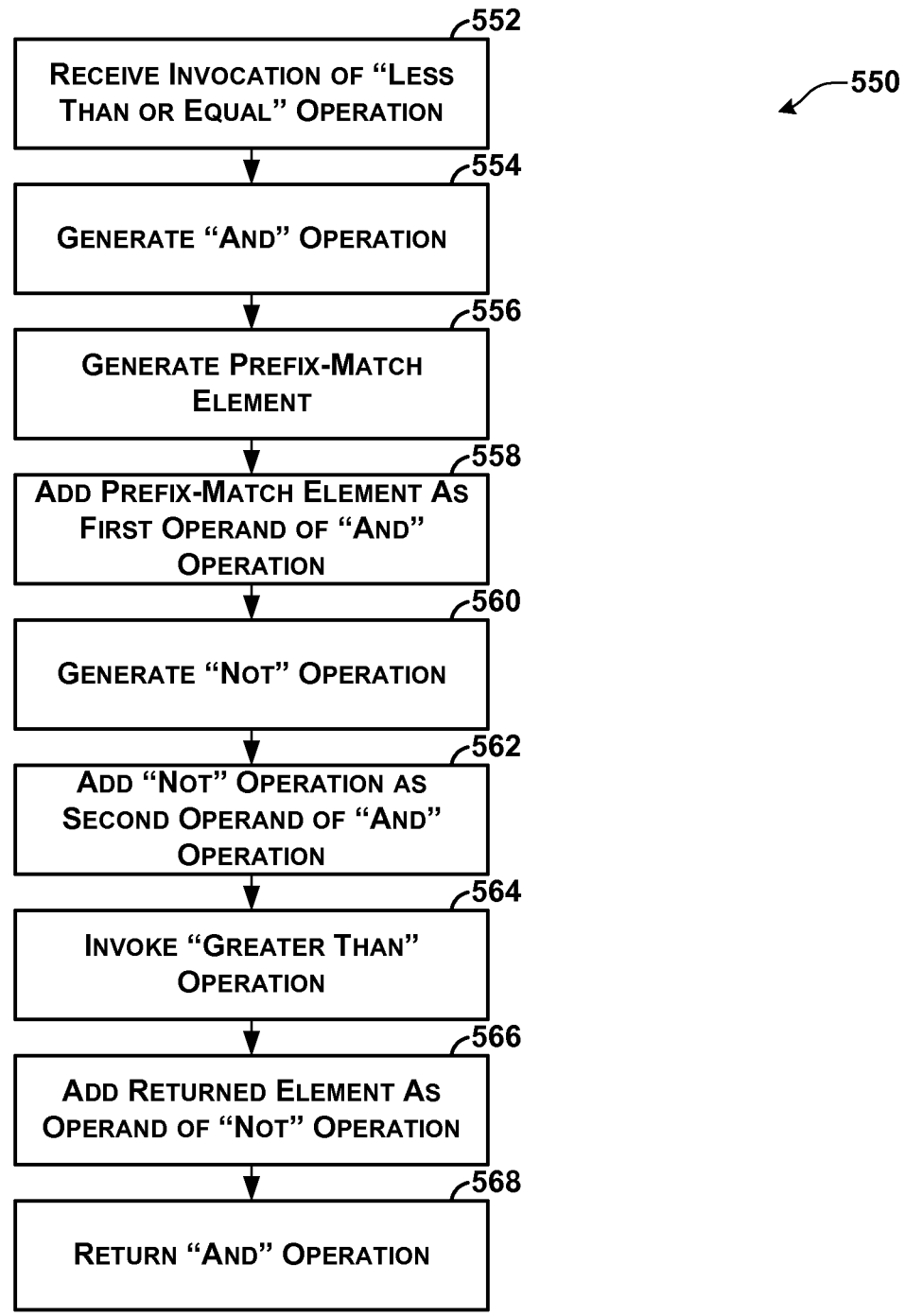
FIG. 12 is a flowchart illustrating an example operation of the server system to transform a "less than or equal" numerical comparison query element.

If the received query element is not a "not equal" numerical comparison query element ("NO" of 326), transformation module 56 determines whether the received query element is a "less than or equal" numerical comparison query element (330). A message object is in a result set of a "less than or equal" numerical comparison query element when the message object has a value of a property specified by the "less than or equal" numerical comparison query element that is less than or equal to a comparison value specified by the "less than or equal" numerical comparison query element. If transformation module 56 determines that the received query element is a "less than or equal" numerical comparison query element ("YES" of 330), transformation module 56 performs an operation that transforms the "less than or equal" numerical comparison query element (332). FIG. 12, described below, illustrates an example operation to transform the "less than or equal" numerical comparison query element. After transformation module 56 transforms the "less than or equal" numerical comparison query element, transformation module 56 returns the textual comparison query element generated by performing the operation that transforms the "less than or equal" numerical comparison query element (308).

If all elements of the search query have been processed ("YES" of 304), query module 54 returns the transformed search query (336).

FIG. 8 is a flowchart illustrating an example operation 350 of server system 6 to transform an "equal" numerical comparison query element. To transform an "equals" numerical comparison query element, transformation module 56 invokes an "equal" function provided by transformation module 56. Operation 350 is an example sequence of actions performed when the "equal" function is invoked. In the example of FIG. 8, the "equal" function is a recursive function. That is, the "equal" function invokes itself.

Operation 350 starts with an invocation of the "equal" function, the invocation providing a set of blocks of a numerical property (352). For example, the set of blocks may include three blocks, one for each nibble of the numerical property. After receiving the invocation, transformation module 56 determines whether there are any blocks in the set of blocks (354). If there are no blocks in the set of blocks ("NO" of 354), transformation module 56 returns a query element that denotes all of the message objects (356).

On the other hand, if there are one or more blocks in the set of blocks ("YES" of 354), transformation module 56 selects one of the blocks in the set of blocks (358). After selecting the block, transformation module 56 removes the block from the set of blocks (360).

Next, transformation module 56 generates an "and" operation query element (362). A message object is in the result set of an "and" operation query element if and only if the message object is in both the result set of a first operand query element and a result set of a second operand query element. Transformation module 56 then generates a base comparison string a length proportional to a number represented by bits in the selected block (364). Next, transformation module 56 appends a textual prefix to the base comparison string to generate a comparison string (366). Transformation module 56 then generates an exact match element that requires the values of the property to exactly match the string (368). Transformation module 56 then adds the exact match query element as a first operand of the "and" operation query element (370).

Transformation module 56 then invokes the "equals" function of transformation module 56 on the remaining set of blocks (372). Thus, operation 350 is repeated on the remaining set of blocks. In response to invoking the "equals" function, transformation module 56 receives a query element. Transformation module 56 adds this query element as the second operand of the "and" operation query element (374). After adding the returned query element as the second operand of the "and" operation query element, transformation module 56 returns the "and" operation query element (376).

FIG. 9 is a flowchart illustrating an example operation 400 of server system 6 to transform a "greater than or equal" numerical comparison query element. To transform a "greater than or equal" numerical comparison query element, query module 54 invokes a "greater than or equal" function provided by transformation module 56. Operation 400 is an example sequence of actions performed when the "greater than or equal" function is invoked. In the example of FIG. 9, the "greater than or equal" function is a recursive function. That is, the "greater than or equal" function invokes itself.

Operation 400 starts when transformation module 56 receives an invocation of operation 400 that specifies a set of blocks of a numerical property and a numerical relationship (402). After receiving the invocation of operation 400, transformation module 56 determines whether the set of blocks only includes one block (404).

If transformation module 56 determines that the set of blocks only includes one block ("YES" of 404), transformation module 56 determines whether received numerical relationship is a "greater than or equal" numerical relationship (405). If the numerical relationship is not a "greater than or equal" numerical relationship, transformation module 56 generates a prefix-match textual comparison query element that specifies a target property and a comparison string (406). The target property is the meta-property associated with the highest-order unprocessed block of the comparison value. The comparison string consists of the textual prefix followed by a base comparison string that has a length equal to one plus a number represented by the highest-order unprocessed block of the comparison value. After generating the prefix-match query element in step 406, transformation module 56 returns the prefix-match query element (407).

On the other hand, if the received numerical relationship is a "greater than or equal" numerical relationship, transformation module 56 generates a prefix-match textual comparison query element that specifies a target property and a comparison string (408). The target property is the meta-property associated with the highest-order unprocessed block of the comparison value. The comparison string consists of the textual prefix followed by a base comparison string that has a length equal to a number represented by the highest-order unprocessed block of the comparison value. After generating the prefix-match query element in step 408, transformation module 56 returns the prefix-match query element (407).

On the other hand if transformation module 56 determines that the set of blocks includes more than one block ("NO" of 404), transformation module 56 selects a highest-order block in the set of blocks (410). The highest-order block contains bits representing the most-significant digits of the number represented by the blocks in the set of blocks. For example, if each block contains one nibble and together the blocks represent the hexadecimal number "0x7D8," (i.e., 2008 in decimal) then transformation module 56 selects the block that contains the bits representing the number "0x7."

After selecting the highest-order block, transformation module 56 removes the highest-order block from the set of blocks (412). Continuing the previous example, after transformation module 56 removes the highest-order block form the set of blocks, together the set of blocks represents the hexadecimal number "0xD8."

Next, transformation module 56 generates an "or" operation query element (414). A message object is in the result set of an "or" operation query element if the message object is either in a result set of a first operand query element or a result set of a second operand query element. For example, in an example notation, the "or" operation query element may appear as:

Or undefined, undefined.

Where the words "undefined" is a stand-in for the first operand query element and the second operand query element.

After generating the "or" operation query element, transformation module 56 generates a prefix-match query element (416). A message object is in the result set of this prefix-match textual comparison query element when the message object has a value of a property specified by the prefix-match textual comparison query element that is a prefix of a comparison string specified by the prefix-match textual comparison query element that has a length proportional to the number of represented by the selected block plus one. For example, if the selected block represents the number 0x7, the prefix-match textual comparison query element may be written in the example notation as: prefix_element("prop1 ", "e2f5aa1zzzzzzzz" ), where "prop1" is the name of a property and where "e2f5aa1" is the numerical prefix and "z" is the text character.

When transformation module 56 has generated the prefix-match query element, transformation module 56 adds the prefix match query element as a first operand query element of the "or" operation query element (420). Continuing the previous example, at this stage the "or" operation query element may appear in the example notation as:

Or
  prefix_element("prop1", "e2f4aa1zzzzzzzz" ),
  undefined.

Next, transformation module 56 generates an "and" operation query element (422). After generating the "and" operation query element, transformation module 56 adds the "and" operation query element as the second operand query element of the "or" operation query element. Continuing the previous example, at this stage the "or" operation query element may appear in the example notation as:

Or
  prefix_element("prop1", "e2f4aa1zzzzzzzz"),
  And
    undefined,
    undefined.

After adding the "and" operation query element as the second operand query element of the "or" operation query element, transformation module 56 generates an exact-match query element (426). A message object is in the result set of this exact-match textual comparison query element when the message object has a value of a property specified by the exact-match textual comparison query element that is equal to a comparison string specified by the exact-match textual comparison query element that has a length proportional to the number of represented by the selected block. Transformation module 56 then adds the exact-match query element as first operand of the "and" operation query element (428). Continuing the previous example, at this stage the "or" operation query element may appear in the example notation as:

Or
  prefix_element("prop1", "e2f4aa1zzzzzzzz"),
  And
    exact_element("prop1", "e2f4aa1zzzzzz"),
    undefined.

Transformation module 56 then recursively invokes operation 400, providing the set of blocks (430). Operation 400 returns a query element. Continuing the previous example, because the set of blocks represents the number 0xD8, transformation module 56 returns the following "or" operation query element in the example notation:

Or
  prefix_element("prop2", "e2f4aa1zzzzzzzzzzzzzz"),
  And
    exact_element("prop2", "e2f4aa1zzzzzzzzzzzz"),
    prefix_element("prop3", "e2f4aa1zzzzzzz").

Transformation module 56 adds the returned query element as the second operand query element of the "and" operation query element (432). Continuing the previous example, the "or" operation query element may appear in the example notation as:

Or
  prefix_element("prop1", "e2f4aa1zzzzzzzz"),
  And
    exact_element("prop1", "e2f4aa1zzzzzz"),
    Or
      prefix_element("prop2", "e2f4aa1zzzzzzzzzzzzzz"),
      And
        exact_element("prop2", "e2f4aa1zzzzzzzzzzzz"),
        prefix_element("prop3", "e2f4aa1zzzzzzz").

After transformation module 56 adds the returned query element as the second operand query element of the "and" operation query element, transformation module 56 returns the "or" operation query element (434).

FIG. 10 is a flowchart illustrating an example operation 450 of server system 6 to transform a "not equal to" restriction. As illustrated in the example of FIG. 10, operation 450 begins when transformation module 56 receives an invocation of a "Not Equal" method (452). With the invocation transformation module 56 receives a set of blocks of a numerical property and a comparison value.

After transformation module 56 receives the invocation of the "Not Equal" method, transformation module 56 generates an "and" operation query element (454). Next, transformation module 56 generates a prefix-match textual comparison query element (456). The prefix-match textual comparison query element specifies a meta-property associated with a highest-order block of the numerical property and a comparison value equal to the textual prefix. Transformation module 56 then adds the prefix-match textual comparison query element as the first operand of the "and" operation query element (458). Transformation module 56 may add the prefix-match textual comparison query element as the first operand of the "and" operation query element to avoid errors that may occur when a values of the property is null or undefined.

Transformation module 56 then generates a "Not" operation query element (460). A message object is in a result set of a "not" operation query element only if the message object is not among the message objects in the result set of an operand query element of the "not" operation query element. After generating the "Not" operation query element, transformation module 56 adds the "Not" operation query element as a second operand of the "And" operation query element (462).

Next, transformation module 56 invokes an "equal" method of transformation module 56 (464). This disclosure describes with reference to FIG. 8 an example operation performed by transformation module 56 when the "equal" method is invoked. When transformation module 56 has completed performing the "equal" method, transformation module 56 adds the query element returned by the "equal" method as the operand of the "Not" operation query element (466). Transformation module 56 may use the "equal" method because those message objects that are not in the set of messages objects that have values of the property that are equal to the comparison value are the same as message objects in the set of message objects that have values of the property that are not equal to the comparison value. Transformation module 56 then returns the "And" operation query element (468).

FIG. 11 is a flowchart illustrating an example operation 500 of server system 6 to transform a "less than" numerical comparison query element. As illustrated in the example of FIG. 11, operation 500 begins when transformation module 56 receives an invocation of a "Less Than" method (502). With the invocation, transformation module 56 receives a set of blocks of a property and a comparison value.

After transformation module 56 receives the invocation of the "Less Than" method, transformation module 56 generates an "and" operation query element (504).

Next, transformation module 56 generates a prefix-match textual comparison query element (506). This prefix-match textual comparison query element specifies a meta-property associated with a highest-order block of the property and a comparison value that is equal to the textual prefix. Transformation module 56 then adds the prefix-match textual comparison query element as the first operand of the "and" operation query element (508). Transformation module 56 may add the prefix-match textual comparison query element as the first operand of the "and" operation query element to avoid errors that may occur when a values of the property is null or undefined.

Transformation module 56 then generates a "Not" operation query element (510). After generating the "Not" operation query element, transformation module 56 adds the "Not" operation query element as a second operand of the "And" operation query element (512).

Next, transformation module 56 invokes a "Greater Than or Equal" method of transformation module 56 (514). This disclosure describes with reference to FIG. 9 an example operation performed by transformation module 56 when the "Greater Than or Equal" method is invoked. When transformation module 56 has completed performing the "Greater Than or Equal" method, transformation module 56 adds the query element returned by the "Greater Than or Equal" method as the operand of the "Not" operation query element (516). Transformation module 56 may use the "Greater Than or Equal" method because those message objects that are not in the set of message objects that have values of the property that are greater than or equal to the comparison value are the same as the message objects in the set of message objects that have values of the property that are less than the comparison value. Transformation module 56 then returns the "And" operation query element (518).

FIG. 12 is a flowchart illustrating an example operation 550 of server system 6 to transform a "less than or equal" numerical comparison query element. As illustrated in the example of FIG. 12, operation 550 begins when transformation module 56 receives an invocation of a "Less Than or Equal" method (552). With the invocation, transformation module 56 receives a set of blocks of a numerical property and a comparison value.

After transformation module 56 receives the invocation of the "Less Than or Equal" method, transformation module 56 generates an "and" operation query element (554).

Next, transformation module 56 generates a prefix-match textual comparison query element (556). This prefix-match textual comparison query element specifies the meta-property associated with a highest-order block of the numerical property and a comparison value equal to the textual prefix. Transformation module 56 then adds the prefix-match textual comparison query element as the first operand of the "and" operation query element (558). Transformation module 56 may add the prefix-match textual comparison query element as the first operand of the "and" operation query element to avoid errors that may occur when a values of the property is null or undefined.

Transformation module 56 then generates a "Not" operation query element (560). After generating the "Not" operation query element, transformation module 56 adds the "Not" operation query element as a second operand of the "And" operation query element (562).

Next, transformation module 56 invokes a "Greater Than" method of transformation module 56 (564). This disclosure describes with reference to FIG. 9 an example operation performed by transformation module 56 when the "Greater Than" method is invoked. When transformation module 56 has completed performing the "Greater Than" method, transformation module 56 adds the query element returned by the "Greater Than" method as the operand of the "Not" operation query element (566). Transformation module 56 may use the "Greater Than or Equal" method because those message objects that are not in the set of message objects that have values of the property that are greater than or equal to the comparison value are the same as the message objects in the set of message objects that have values of the property that are less than the comparison value. Transformation module 56 then returns the "And" operation query element (568).

Figure 13:
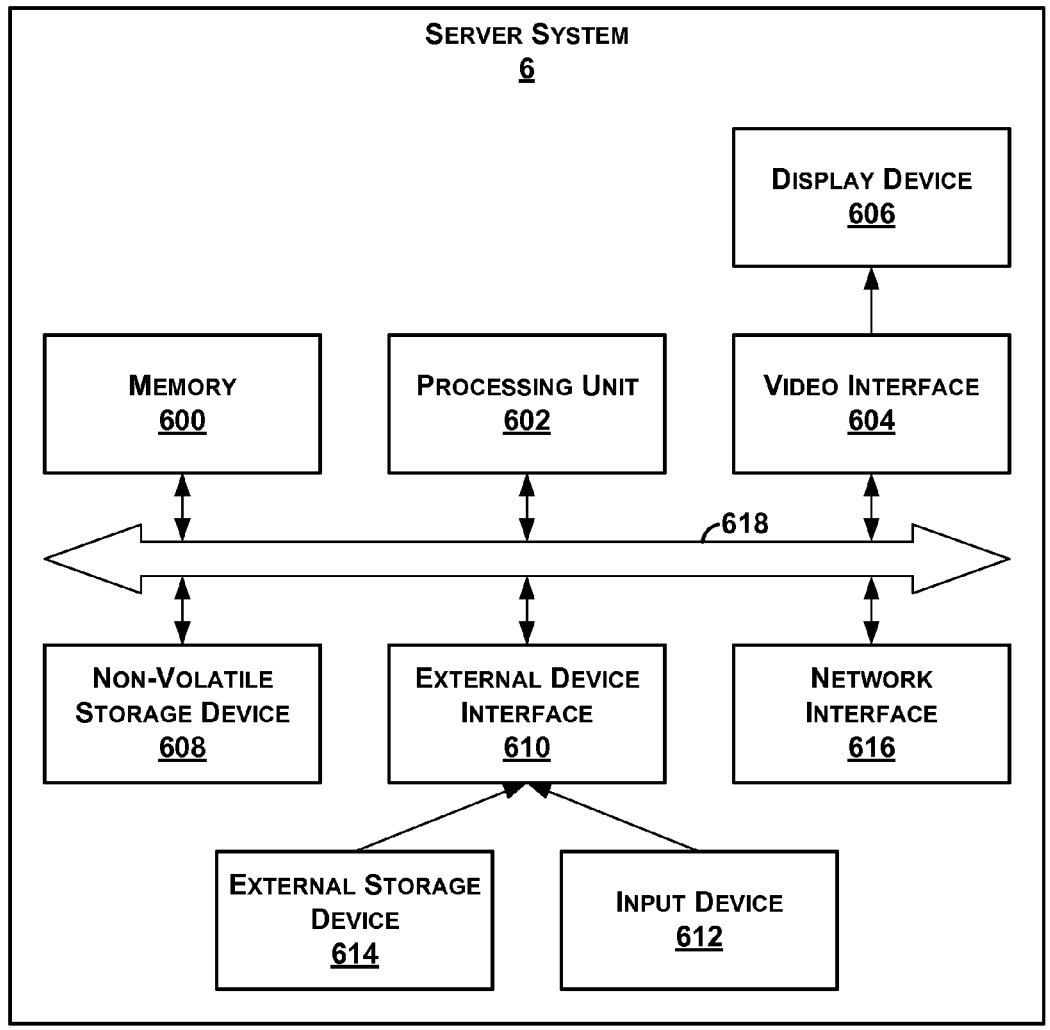
FIG. 13 is a block diagram illustrating example physical components of the server system.

FIG. 13 is a block diagram illustrating example physical components of server system 6. As illustrated in the example of FIG. 13, server system 6 comprises a memory unit 600. Memory unit 600 is a computer-readable storage medium that is capable of storing data and instructions. Memory unit 600 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, server system 6 comprises a processing unit 602. In a first example, processing unit 602 may execute software instructions that cause processing unit to provide specific functionality. In this first example, processing unit 602 may be implemented as one or more processing cores and/or as one or more separate microprocessors. For instance, in this first example, processing unit 602 may be implemented as one or more Intel Core 2 microprocessors. Processing unit 602 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 602 may be implemented as an application specific integrated circuit (ASIC) that provides specific functionality. In an third example, processing unit 602 may provide specific functionality by using an ASIC and by executing software instructions.

Server system 6 also comprises a video interface 604 that enables server system 6 to output video information to a display device 606. Display device 606 may be a variety of different types of display devices. For instance, display device 606 may be a cathode-ray tube display, an LCD display panel, a plasma screen display panel, a touch-sensitive display panel, a LED array, or another type of display device.

In addition, server system 6 includes a non-volatile storage device 608. Non-volatile storage device 608 is a computer-readable storage medium that is capable of storing data and/or instructions. Non-volatile storage device 608 may be a variety of different types of different non-volatile storage devices. For example, non-volatile storage device 608 may be one or more hard disk drives, magnetic tape drives, CD-ROM drives, DVD-ROM drives, Blu-Ray disc drives, or other types of non-volatile storage devices.

Server system 6 also includes an external component interface 610 that enables server system 6 to communicate with external components. As illustrated in the example of FIG. 5, external component interface 610 communicates with an input device 612 and an external storage device 614. In one implementation of server system 6, external component interface 610 is a Universal Serial Bus (USB) interface. In other implementations of server system 6, server system 6 may include another type of interface that enables server system 6 to communicate with input device and/or output devices. For instance, server system 6 may include a PS/2 interface. Input device 612 may be a variety of different types of devices including, but not limited to keyboards, mice, trackballs, stylus input devices, touch pads, touch-sensitive display screens, or other types of input devices. External storage device 614 may be a variety of different types of computer-readable storage media including magnetic tape, flash memory modules, magnetic disk drives, optical disc drives, and other computer-readable storage media.

In addition, server system 6 includes a network interface 616 that enables server system 6 to send data to and receive data from network 18. Network interface 616 may be a variety of different types of network interface. For example, network interface 616 may be an Ethernet interface, a token-ring network interface, a fiber optic network interface, a wireless network interface (e.g., WiFi, WiMax, etc.), or another type of network interface.

Server system 6 also includes a communications medium 618 that facilitates communication among the various components of server system 6. Communications medium 618 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Several computer-readable storage media are illustrated in the example of FIG. 13 (i.e., memory 600, non-volatile storage device 608, and external storage device 614). Together, these computer-readable storage media may constitute a single logical computer-readable storage medium. This single logical computer-readable storage medium may store instructions executable by processing unit 602. Actions described in the above description may result from the execution of the instructions stored on this single logical computer-readable storage medium. Thus, when this description says that a particular logical module performs a particular action, such a statement may be interpreted to mean that instructions of the software module cause a processing unit, such as processing unit 602, to perform the action.

The technologies of this disclosure may be realized in many ways. For example, the technologies of this disclosure may be realized as a method performed by an electronic computing system, the method comprising storing, on a computer-readable data storage system, a set of data objects, each of the data objects comprising a numerical property having a binary numerical value represented by bits dividable into a set of evenly-sized blocks. In addition, the method comprises storing, on the computer-readable data storage system, a search index that contains search index entries, each of which specifies a reference string and a set of data object identifiers. Furthermore, the method comprises automatically transforming, at the electronic computing system, an original search query into a transformed search query such that a numerical comparison query element in the original search query that specifies the numerical property is transformed into an equivalent textual comparison query element in the transformed search query. In addition, the method comprises automatically using, at the electronic computing system, the search index to identify a result set that contains ones of the data objects that satisfy the transformed search query. Furthermore, the method comprises after identifying the result set, automatically presenting, at a presentation device, in response to the original search query, a list of the data objects in the result set.

In another example, the technologies of this disclosure may be realized as an electronic computing system comprising a processing unit. The electronic computing system also comprises a physical network interface that enables the electronic computing system to communicate with a client computing system via an electronic communications network. Furthermore, the electronic computing system comprises a computer-readable data storage system that comprises a database that stores a set of message objects, each of the message objects comprising a numerical property having a binary numerical value represented by bits dividable into a set of evenly-sized blocks. The computer-readable data storage system also comprises a search index that contains search index entries, each of which specifies a reference string and a set of message object identifiers. In addition, the computer-readable data storage system comprises a network interface driver that, when executed by the processing unit, configures the physical network interface to receive via the electronic communications network an original search query sent by the client computing system, the search query specifying a numerical comparison query element that denotes a subset of the message objects that have a specified numerical relationship to a specified numerical comparison value. The computer-readable data storage system also comprises a transformation module that, when executed by the processing unit, automatically transforms the original search query into a transformed search query such that the numerical comparison query element is transformed into an equivalent textual comparison query element in the transformed search query. Furthermore, the computer-readable data storage system comprises a query module that, when executed by the processing unit, uses the search index to identify a result set that contains ones of the message objects that satisfy the transformed search query and returns a list of the message objects in the result set to the client computing system.

In another example, the technologies of this disclosure may be realized as a computer-readable storage medium comprising instructions that, when executed by a processing unit, cause the processing unit to automatically determine whether all email message objects in a set of message objects have been indexed, wherein the set of message objects is stored at a computer-readable data storage system, each of the message objects comprising at least one textual property and at least one numerical date property having a binary numerical value represented by bits dividable into a plurality of evenly-sized blocks. For each message object in the set of message objects and has not been indexed the instructions cause the processing unit to:

(1) automatically select a property of a selected message object that is in the set of message objects and has not been indexed;

(2) automatically determine whether the selected property is the numerical date property;

(3) when it is determined that the selected property is the numerical date property:

(a) automatically determine whether each block in a set of blocks that represent the numerical date property have been processed;

(b) when it is determined that a selected block in the set of blocks has not been processed, automatically identify a first search index entry in a search index that is associated with a meta-property associated with the selected block and that specifies a reference string comprising a textual prefix and a base reference string having a length equal to a number represented by the selected block plus one; and (c) after identifying the first search index entry, automatically add an identifier of the selected message object to the first search index entry;

(4) when it is determined that the selected property is a textual property:
  (a) automatically tokenize a text string specified by the selected message object for the selected property, thereby generating a set of tokens;
  (b) automatically identify a second search index entry in the search index that is associated with the selected property and that specifies a reference string equal to the selected token; and
  (c) automatically add an identifier of the selected message object to the second search index entry;

In addition, the instructions, when executed by the processing unit, cause the processing unit to receive, via an electronic communications network, an original search query sent by a client computing system, the search query specifying a numerical comparison query element that denotes a subset of the message objects that have a specified numerical relationship to a specified date. The instructions, when executed by the processing unit, also cause the processing unit to automatically transform the original search query into a transformed search query such that the numerical comparison query element is transformed into an equivalent textual comparison query element in the transformed search query. Furthermore, the instructions, when executed by the processing unit, cause the processing unit to automatically identify each search index entry in the search index that:

(a) is associated with one of the meta-properties associated with the date property; and
(b) specify a reference string that comprises a base reference string that has a length equal to a number represented by one of the blocks of the date property;
(c) send, via the electronic communications network, a result set in response to the search query, the result set containing ones of the message objects that are specified by each of the identified search index entries.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the above discussion has been presented in the context of message objects. However, the principles of this disclosure are not limited to message objects. Rather, the principles of this disclosure may be applied to other types of data objects that comprise numerical properties and textual properties. For instance, the principles of this disclosure may be applied to file system files, database records, data cubes, and other types of data object that comprise numerical properties and textual properties.

We claim:

1. A method performed by an electronic computing system, the method comprising:
   storing, on a computer-readable data storage system, a set of data objects, each of the data objects comprising a numerical property having a binary numerical value represented by bits dividable into a set of evenly-sized blocks;
   storing, on the computer-readable data storage system, a search index that contains search index entries, each of which specifies a reference string and a set of data object identifiers, the object identifier referencing a message object from in a message located in a mailbox to the search index, each search index entry including one of a textual property or numerical property, the textual property including textual data, the numerical property is associated with one or more meta-properties being proportional to a number of bits in the numerical property;
   automatically generating the search index at the electronic computing system, including:
   receiving, at the electronic computing system, an indexing event indicating a change in the set of data objects when a change has occurred, wherein the indexing event notifies the electronic computing system that a data object has been added, deleted, or edited; and
   responding to the indexing event to index the data object including:
      determining if a property of a message object is numerical or textual;
         in response to determining the property is textual, tokenizing the property and identifying a search index entry that corresponds to a category in the search index associated with the selected property and token;
         in response to determining the property is numerical, creating a block wherein the block is a fixed-size set of bits within the numerical property, identifying a number represented by bits of the selected block, and locating a search index entry in the search index that is associated with a meta-property associated with the identified number represented by bits, the search index entry comprising a reference string, the reference string is alphanumeric data is that located in the search index entry, and having a length proportional to the number represented by the bits in the block;
   automatically transforming, at the electronic computing system, the original search query into a transformed search query such that a transformed search query includes a textual comparison query element, a numerical comparison query element and an operation query element,
      the textual comparison element includes a textual property, a comparison string and a string comparison relationship, wherein the comparison string is provided by the original search query and the string comparison relationship specifies the type relationship of the data that is to be searched, and
      the numerical comparison element consist of numerical property, a numerical comparison value and a numerical comparison relationship, wherein the numerical comparison value is provided by the original search query and the numerical string comparison relationship specifies the type relationship of the data that is to be searched, the numerical comparison query element in the original search query that specifies the numerical property is transformed into an equivalent textual comparison query element in the transformed search query, the equivalent textual comparison query element not including the numerical property specified in the numerical comparison query element;
   automatically using, at the electronic computing system, the search index to identify a result set that contains ones of the data objects that satisfy the transformed search query; and
   and after identifying the result set, automatically presenting, at a presentation device, in response to the original search query, a list of the data objects in the result set.

2. The method of claim 1,
wherein the data objects are message objects; and
wherein the method further comprises receiving the original search query at the electronic computing system from a client computing system via an electronic communications network.

3. The method of claim 2, wherein the message objects are email message objects.

4. The method of claim 1, wherein each of the blocks consist of four bits.

5. The method of claim 1, wherein responding to the indexing event comprises:
automatically determining, at the electronic computing system, whether all of the data objects in the set of data objects have been indexed; and
in response to determining that a data object in the set of data objects has not been indexed, automatically indexing the selected data object.

6. The method of claim 5, further comprising in response to determining that all of the data objects in the set of data objects have been indexed, automatically indexing data objects in the set of data objects on a notification-driven basis.

7. The method of claim 5, wherein indexing the selected data object comprises:
automatically selecting, at the electronic computing system, a property of the selected data object;
automatically determining, at the electronic computing system, whether the selected property is the numerical property;
when it is determined that the selected property is the numerical property, automatically determining, at the electronic computing system, whether each block in a set of blocks that represent the numerical property have been processed;
when it is determined that a selected block in the set of blocks has not been processed, automatically identifying, at the electronic computing system, a first search index entry in the search index that is associated with a meta-property associated with the selected block and that specifies a reference string comprising a base reference string having a length proportional to a number represented by the selected block; and
after identifying the first search index entry, automatically adding, at the electronic computing system, an identifier of the selected data object to the first search index entry.

8. The method of claim 7, wherein indexing the selected data object further comprises:
when it is determined that the selected property is a textual property, automatically tokenizing, at the electronic computing system, a text string specified by the selected data object for the selected property, thereby generating a set of tokens;
automatically selecting, at the electronic computing system, a token in the set of tokens;
automatically identifying, at the electronic computing system, a second search index entry in the search index that is associated with the selected property and that specifies a reference string equal to the selected token; and
automatically adding, at the electronic computing system, an identifier of the selected data object to the second search index entry.

9. The method of claim 1, wherein automatically transforming the original search query into the transformed search query comprises:
automatically determining, at the electronic computing system, whether all atomic query elements in the original search query have been processed;
when it is determined that one or more of the atomic query elements in the original search query have not been processed, automatically selecting, at the electronic computing system, a selected atomic query element among the one or more of the atomic query elements in the original search query that have not been processed;
after selecting the selected atomic query element, automatically determining, at the electronic computing system, whether the selected atomic query element is an atomic numerical comparison query element;
when it is determined that the selected atomic query element is a numerical comparison query element, automatically determining, at the electronic computing system, whether the selected atomic query element is an equality numerical comparison query element;
when it is determined that the selected atomic query element is an equality numerical comparison query element, automatically performing, at the electronic computing system, an equality transformation on the selected atomic query element;
when it is determined that the selected atomic query element is a numerical comparison query element, automatically determining, at the electronic computing system, whether the selected atomic query element is a greater than or equals numerical comparison query element;
when it is determined that the selected atomic query element is a greater than or equals numerical comparison query element, automatically performing, at the electronic computing system, a greater than or equals transformation on the selected atomic query element;
when it is determined that the selected atomic query element is a numerical comparison query element, automatically determining, at the electronic computing system, whether the selected atomic query element is a greater than numerical comparison query element;
when it is determined that the selected atomic query element is a greater than numerical comparison query element, automatically performing, at the electronic computing system, a greater than transformation on the selected atomic query element;
when it is determined that the selected atomic query element is a numerical comparison query element, automatically determining, at the electronic computing system, whether the selected atomic query element is a not equals numerical comparison query element;
when it is determined that the selected atomic query element is a not equals numerical comparison query element, automatically performing, at the electronic computing system, a not equals transformation on the selected atomic query element;
when it is determined that the selected atomic query element is a numerical comparison query element, automatically determining, at the electronic computing system, whether the selected atomic query element is a less than numerical comparison query element;
when it is determined that the selected atomic query element is a less than numerical comparison query element, automatically performing, at the electronic computing system, a less than transformation on the selected atomic query element;
when it is determined that the selected atomic query element is a numerical comparison query element, automatically determining, at the electronic computing system, whether the selected atomic query element is a less than or equal numerical comparison query element; and when it is determined that the selected atomic query element is a less than or equal numerical comparison query element, automatically performing, at the electronic computing system, a less than or equal transformation on the selected atomic query element.

10. The method of claim 9, wherein automatically performing the equality transformation comprises:
receiving, at the electronic computing system, an invocation of the equality transformation that specifies a set of unprocessed blocks of a property specified by the selected atomic query element and a comparison value specified by the selected atomic query element;
automatically determining, at the electronic computing system, whether the set of unprocessed blocks includes at least one block;
when it is determined that the set of unprocessed blocks includes at least one block, selecting, at the electronic computing system, a selected block from among the set of unprocessed blocks;
automatically generating, at the electronic computing system, an "and" operation query element;
automatically generating, at the electronic computing system, an comparison string that comprises a base comparison string that has a length proportional to a number represented by the selected block;
automatically generating, at the electronic computing system, an exact match text comparison query element that specifies a meta-property associated with the selected block and that specifies the comparison string;
automatically adding, at the electronic computing system, the exact match text comparison query element as a first operand of the "and" operation query element;
automatically removing, at the electronic computing system, the selected block from the set of unprocessed blocks;
after removing the selected block from the set of unprocessed blocks, automatically performing, at the electronic computing system, the equality transformation on the set of unprocessed blocks;
after performing the equality transformation on the set of unprocessed blocks, adding, at the electronic computing system, a textual comparison query element generated by performing the equality transformation on the set of unprocessed blocks as a second operand of the "and" operation query element;
after adding the textual comparison query element, returning, at the electronic computing system, the "and" operation query element; and
when it is determined that the set of unprocessed blocks does not include at least one block, returning, at the electronic computing system, a query element that denotes all of the data objects.

11. The method of claim 9, wherein automatically performing the greater than transformation comprises:
receiving, at the electronic computing system, an invocation of the greater than transformation that specifies a set of unprocessed blocks of a property specified by the selected atomic query element and a comparison value specified by the selected atomic query element;
automatically determining, at the electronic computing system, whether the set of unprocessed blocks includes a plurality of blocks;
when it is determined that the set of unprocessed blocks includes a plurality of blocks, removing, at the electronic computing system, a highest-order block in the set of unprocessed blocks from the set of unprocessed blocks;
after removing the highest-order block, automatically generating, at the electronic computing system, an "or" operation query element;
automatically generating, at the electronic computing system, a first prefix-match query element that specifies a meta-property associated with the highest-order block and a comparison string that comprises a base comparison string that has a length proportional to one plus a number represented by the highest-order block;
automatically adding, at the electronic computing system, the first prefix-match query element as a first operand of the "or" operation query element;
automatically generating, at the electronic computing system, an "and" operation query element;
automatically adding, at the electronic computing system, the "and" operation query element as a second operand of the "or" operation query element;
automatically generating, at the electronic computing system, an exact-match query element that specifies the meta-property associated with the highest-order block and specifies a comparison string that comprises a base comparison string that has a length proportional to the number represented by the highest-order block;
automatically adding, at the electronic computing system, the exact-match query element as a first operand of the "and" operation query element;
after removing the highest-order block from the set of unprocessed blocks, automatically performing, at the electronic computing system, the greater than transformation on the set of unprocessed blocks;
after performing the greater than transformation on the set of unprocessed blocks, adding, at the electronic computing system, a textual comparison query element as a second operand of the "and" operation query element;
after adding the textual comparison query element, returning, at the electronic computing system, the "or" operation query element; and
when it is determined that the set of unprocessed blocks does not include a plurality of blocks, automatically generating, at the electronic computing system, a second prefix-match element that specifies a meta-property associated with a block in the set of unprocessed blocks and a comparison string that comprises a base comparison string that has a length equal to one plus a number represented by the block in the set of unprocessed blocks; and
after generating the second prefix-match element, automatically returning, at the electronic computing system, the second prefix-match element.

12. An electronic computing system comprising:
a processing unit;
a physical network interface that enables the electronic computing system to communicate with a client computing system via an electronic communications network; and
a computer-readable data storage system that comprises:
a database that stores a set of message objects, each of the message objects comprising a numerical property having a binary numerical value represented by bits dividable into a set of evenly-sized blocks;
a search index that contains search index entries, each of which specifies a reference string and a set of message object identifiers, the object identifier referencing a message object from in a message located in a mailbox to the search index, each search index entry including one of a textual property or numerical property, the textual property including textual data, the numerical property is associated with one or more meta-properties being proportional to a number of bits in the numerical property;

a network interface driver that, when executed by the processing unit, configures the physical network interface to receive via the electronic communications network an original search query sent by the client computing system, the search query specifying a numerical comparison query element that denotes a subset of the message objects that have a specified numerical relationship to a specified numerical comparison value;

an indexing module that, when executed by the processing unit, receives an indexing event indicating a change in the set of data objects when a change has occurred, wherein the indexing event indicates that a data object has been added, deleted, or edited, responding to the indexing event to index the data object including: determining if a property of a message object is numerical or textual; in response to determining the property is textual, tokenizing the property and identifying a search index entry that corresponds to a category in the search index associated with the selected property and token; and in response to determining the property is numerical, creating a block wherein the block is a fixed-size set of bits within the numerical property, identifying a number represented by bits of the selected block, and locating a search index entry in the search index that is associated with a meta-property associated with the identified number represented by bits, the search index entry comprising a reference string, the reference string is alphanumeric data is that located in the search index entry, and having a length proportional to the number represented by the bits in the block;

a transformation module that, when executed by the processing unit, automatically transforms the original search query into a transformed search query such that a transformed search query includes a textual comparison query element, a numerical comparison query element and an operation query element, the textual comparison element includes a textual property, a comparison string and a string comparison relationship, wherein the comparison string is provided by the original search query and the string comparison relationship specifies the type relationship of the data that is to be searched, and the numerical comparison element consist of numerical property, a numerical comparison value and a numerical comparison relationship, wherein the numerical comparison value is provided by the original search query and the numerical string comparison relationship specifies the type relationship of the data that is to be searched, the numerical comparison query element is transformed into an equivalent textual comparison query element in the transformed search query, the equivalent textual comparison query element not including the numerical property specified in the numerical comparison query element; and a query module that, when executed by the processing unit, uses the search index to identify a result set that contains ones of the message objects that satisfy the transformed search query and returns a list of the message objects in the result set to the client computing system.

13. The electronic computing system of claim 12, wherein the message objects are email message objects.

14. The electronic computing system of claim 12, wherein the indexing module, when executed by the processing unit, causes the processing unit to:
   automatically determine whether all of the message objects in the set of message objects have been indexed;
   in response to determining that a selected message object in the set of message objects has not been indexed, automatically select a property of the selected message object;
   automatically determine whether the selected property is the numerical property;
   when it is determined that the selected property is the numerical property, automatically determine whether each block in a set of blocks that represent the selected numerical property have been processed;
   when it is determined that a selected block in the set of blocks has not been processed, automatically identify a first search index entry in the search index that is associated with a meta-property associated with the selected block and that specifies a reference string comprising a base reference string having a length proportional to a number represented by the selected block; and
   after the first search index entry is identified, automatically adding an identifier of the selected message object to the first search index entry.

15. The electronic computing system of claim 14, wherein the indexing module further causes the processing unit to:
   automatically tokenize a text string specified by the selected message object for the selected property, thereby generating a set of tokens;
   automatically select a token in the set of tokens;
   automatically identify a second search index entry in the search index that is associated with the selected property and that specifies a reference string equal to the selected token; and
   automatically add an identifier of the selected message object to the second search index entry.

16. The electronic computing system of claim 14, wherein the reference string comprises a textual prefix in addition to the base reference string.

17. The electronic computing system of claim 12, wherein the transformation module causes the processing unit to automatically transform the original search query into the transformed search query at least in part by causing the processing unit to:
   automatically determine whether the numerical comparison query element is an equality numerical comparison query element; and
   when it is determined that the numerical comparison query element is an equality numerical comparison query element, the transformation module causes the processing unit to:
      receive an invocation of the equality transformation that specifies a set of unprocessed blocks of a property specified by the selected atomic query element and a comparison value specified by the selected atomic query element;
      automatically determine whether the set of unprocessed blocks includes at least one block;
      when it is determined that the set of unprocessed blocks includes at least one block, select a selected block from among the set of unprocessed blocks;
      automatically generate an "and" operation query element;

automatically generate a comparison string that comprises a base comparison string that has a length proportional to a number represented by the selected block;

automatically generate an exact match text comparison query element that specifies a meta-property associated with the selected block and that specifies the comparison string;

automatically add the exact match text comparison query element as a first operand of the "and" operation query element;

automatically remove the selected block from the set of unprocessed blocks;

after removing the selected block from the set of unprocessed blocks, automatically perform the equality transformation on the set of unprocessed blocks;

after performing the equality transformation on the set of unprocessed blocks, add a textual comparison query element generated by performing the equality transformation on the set of unprocessed blocks as a second operand of the "and" operation query element;

after adding the textual comparison query element, return the "and" operation query element; and when it is determined that the set of unprocessed blocks does not include at least one block, return a query element that denotes all of the message objects.

18. The electronic computing system of claim 12, wherein the transformation module causes the processing unit to automatically transform the original search query into the transformed search query at least in part by causing the processing unit to:

receive an invocation of the greater than transformation that specifies a set of unprocessed blocks of a property specified by the selected atomic query element and a comparison value specified by the selected atomic query element;

automatically determine whether the set of unprocessed blocks includes a plurality of blocks;

when it is determined that the set of unprocessed blocks includes a plurality of blocks, remove a highest-order block in the set of unprocessed blocks from the set of unprocessed blocks;

after removing the highest-order block, automatically generate an "or" operation query element;

automatically generate a first prefix-match query element that specifies a meta-property associated with the highest-order block and a comparison string that comprises a base comparison string that has a length proportional to one plus a number represented by the highest-order block;

automatically add the first prefix-match query element as a first operand of the "or" operation query element;

automatically generate an "and" operation query element;

automatically add the "and" operation query element as a second operand of the "or" operation query element;

automatically generate an exact-match query element that specifies the meta-property associated with the highest-order block and specifies a comparison string that comprises a base comparison string that has a length proportional to the number represented by the highest-order block;

automatically add the exact-match query element as a first operand of the "and" operation query element;

after removing the highest-order block from the set of unprocessed blocks, automatically perform, the greater than transformation on the set of unprocessed blocks;

after performing the greater than transformation on the set of unprocessed blocks, add a textual comparison query element as a second operand of the "and" operation query element;

after adding the textual comparison query element, returning, at the electronic computing system, the "or" operation query element; and when it is determined that the set of unprocessed blocks does not include a plurality of blocks, automatically generating, at the electronic computing system, a second prefix-match element that specifies a meta-property associated with a block in the set of unprocessed blocks and a comparison string that comprises a base comparison string that has a length equal proportional to one plus a number represented by the block in the set of unprocessed blocks; and after generating the second prefix-match element, automatically return the second prefix-match element.

19. A computer-readable storage medium comprising instructions that, when executed by a processing unit of an electronic computing system, cause the processing unit to:

automatically determine based on an indexing event indicating that a data object has been added, deleted, or edited, the indexing event sent to an indexing module when a change has occurred in the set of data objects, whether all email message objects in a set of message objects have been indexed, wherein the set of message objects is stored at a computer-readable data storage system, the object identifier referencing a message object from in a message located in a mailbox to the search index, each of the message objects comprising at least one textual property and at least one numerical date property , the textual property including textual data, the numerical property is associated with one or more meta-properties having a binary numerical value represented by bits dividable into a plurality of evenly-sized blocks;

for each message object in the set of message objects and has not been indexed:

(1) automatically select a property of a selected message object that is in the set of message objects and has not been indexed;

(2) automatically determine whether the selected property is the numerical date property;

(3) when it is determined that the selected property is the numerical date property:

(a) automatically determine whether each block in a set of blocks that represent the numerical date property have been processed, each block is a fixed-size set of bits within the numerical property, identifying a number represented by bits of the selected block, and locating a search index entry in the search index that is associated with a meta-property associated with the identified number represented by bits, the search index entry comprising a reference string, the reference string is alphanumeric data is that located in the search index entry, and having a length proportional to the number represented by the bits in the block;

(b) when it is determined that a selected block in the set of blocks has not been processed, automatically identify a first search index entry in a search index that is associated with a meta-property associated with the selected block and that specifies a reference string comprising a textual prefix and a base reference string having a length equal to a number represented by the selected block plus one; and (c) after identifying the first search index entry, automatically add an identifier of the selected message object to the first index entry;
(4) when it is determined that the selected property is a textual property:
  (a) automatically tokenize a text string specified by the selected message object for the selected property, thereby generating a set of tokens;
  (b) automatically identify a second search index entry that corresponds to a category in the search index that is associated with the selected property and that specifies a reference string equal to the selected token; and
  (c) automatically add an identifier of the selected message object to the second search index entry;

receive, via an electronic communications network, an original search query sent by a client computing system, the search query specifying a numerical comparison query element that denotes a subset of the message objects that have a specified numerical relationship to a specified date;

automatically transform the original search query into a transformed search query such that a transformed search query includes a textual comparison query element, a numerical comparison query element and an operation query element, the textual comparison element includes a textual property, a comparison string and a string comparison relationship, wherein the comparison string is provided by the original search query and the string comparison relationship specifies the type relationship of the data that is to be searched, and the numerical comparison element consist of numerical property, a numerical comparison value and a numerical comparison relationship, wherein the numerical comparison value is provided by the original search query and the numerical string comparison relationship specifies the type relationship of the data that is to be searched, the numerical comparison query element is transformed into an equivalent textual comparison query element in the transformed search query, the equivalent textual comparison query element not including the numerical property specified in the numerical comparison query element; and automatically identify each search index entry in the search index that:
  a) is associated with one of the meta-properties associated with the date property; and
  b) specifies a reference string that comprises a base reference string that has a length equal to a number represented by one of the blocks of the date property;

send, via the electronic communications network, a result set in response to the search query, the result set containing ones of the message objects that are specified by each of the identified search index entries.

* * * * *